US010293851B2

(12) United States Patent
Ukai

(10) Patent No.: US 10,293,851 B2
(45) Date of Patent: May 21, 2019

(54) MOTOR CONTROL DEVICE, ELECTRIC POWER STEERING DEVICE, AND VEHICLE

(71) Applicant: NSK Ltd., Shinagawa-ku, Tokyo (JP)

(72) Inventor: Nobuo Ukai, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/542,767

(22) PCT Filed: Jul. 25, 2016

(86) PCT No.: PCT/JP2016/071748
§ 371 (c)(1),
(2) Date: Jul. 11, 2017

(87) PCT Pub. No.: WO2017/026262
PCT Pub. Date: Feb. 16, 2017

(65) Prior Publication Data
US 2017/0369094 A1    Dec. 28, 2017

(30) Foreign Application Priority Data

Aug. 12, 2015   (JP) .................................. 2015-159584

(51) Int. Cl.
*B62D 5/04*       (2006.01)
*H02P 6/16*       (2016.01)
(Continued)

(52) U.S. Cl.
CPC ........... *B62D 5/0487* (2013.01); *B62D 5/049* (2013.01); *B62D 5/0463* (2013.01);
(Continued)

(58) Field of Classification Search
CPC .. B62D 5/0487; B62D 5/0463; B62D 5/0493; B62D 15/021; B62D 5/049; H02P 29/028
(Continued)

(56) References Cited

U.S. PATENT DOCUMENTS 7,071,651 B2    7/2006   Toyozawa et al.
7,694,777 B2    4/2010   Yamashita et al.
(Continued)

FOREIGN PATENT DOCUMENTS

JP   2000-217386 A   8/2000
JP   2005-130582 A   5/2005
(Continued)

OTHER PUBLICATIONS

English Translation: Yanai, JP 2011051537 A, Mar. 2011, Japanese Patent Office Publication (Year: 2011).*
(Continued)

*Primary Examiner* — Nadeem Odeh
(74) *Attorney, Agent, or Firm* — Crowell & Moring LLP

(57) ABSTRACT

An electric motor can be accurately drive-controlled even when a failure occurs in a motor electric angle detection unit. When at least one of a resolver and an angle computation unit is diagnosed as abnormal in an initial diagnosis after a system restart, a motor electric angle initial value is estimated on a basis of a response output of a three-phase electric motor in response to input of a motor drive signal to the three-phase electric motor, a motor electric angle estimation value is calculated on a basis of an output shaft rotation angle detection value detected by an output-side rotation angle sensor and a relative offset amount estimated on a basis of the estimated motor electric angle initial value, and the three-phase electric motor is drive-controlled on a basis of the calculated motor electric angle estimation value.

3 Claims, 11 Drawing Sheets

(51) Int. Cl.
  *B62D 15/02* (2006.01)
  *H02P 25/22* (2006.01)
  *H02P 29/028* (2016.01)

(52) U.S. Cl.
  CPC ......... *B62D 5/0484* (2013.01); *B62D 5/0493* (2013.01); *B62D 15/021* (2013.01); *H02P 6/16* (2013.01); *H02P 25/22* (2013.01); *H02P 29/028* (2013.01)

(58) Field of Classification Search
  USPC .................................................. 701/30.2, 43
  See application file for complete search history.

(56) References Cited

U.S. PATENT DOCUMENTS

| | | | |
|---|---|---|---|
| 8,421,388 B2 | 4/2013 | Mukai | |
| 9,385,648 B2 | 7/2016 | Suzuki | |
| 2006/0107763 A1 | 5/2006 | Paek | |
| 2011/0035114 A1* | 2/2011 | Yoneda | B62D 5/046 701/42 |
| 2011/0087456 A1* | 4/2011 | Satou | B62D 5/049 702/151 |
| 2014/0288779 A1* | 9/2014 | Di Cairano | B62D 15/0235 701/42 |

FOREIGN PATENT DOCUMENTS

| | | | |
|---|---|---|---|
| JP | 2007-269277 A | | 10/2007 |
| JP | 2008-37399 A | | 2/2008 |
| JP | 2010-29030 A | | 2/2010 |
| JP | 2011051537 A | * | 3/2011 |
| JP | 2012-90471 A | | 5/2012 |
| JP | 4998836 B2 | | 8/2012 |

OTHER PUBLICATIONS

International Preliminary Report on Patentability (PCT/IB/338 & PCT/IB/373) issued in PCT Application No. PCT/JP2016/071748 dated Feb. 22, 2018, including English translation of document C2 (Japanese-language Written Opinion (PCT/ISA/237)) previously filed on Jul. 11, 2017 (eight (8) pages).

International Search Report (PCT/ISA/210) issued in PCT Application No. PCT/JP2016/071748 dated Oct. 18, 2016 with English translation (five pages).

Japanese-language Written Opinion (PCT/ISA/237) issued in PCT Application No. PCT/JP2016/071748 dated Oct. 18, 2016 (four pages).

European Search Report issued in counterpart Japanese Application No. 16834959.5 dated Mar. 26, 2018 (eight (8) pages).

* cited by examiner

MOTOR CONTROL DEVICE, ELECTRIC POWER STEERING DEVICE, AND VEHICLE

CROSS-REFERENCE TO RELATED APPLICATIONS

The present application claims priority to Japanese Patent Application No. 2015-159584 (filed on Aug. 12, 2015), the entire contents of which are incorporated herein by reference.

TECHNICAL FIELD

The present invention relates to a motor control device that drive-controls a multi-phase electric motor incorporated in an electric power steering device.

BACKGROUND ART

As a motor control device that controls an electric motor of an electric power steering device that is incorporated in a vehicle, for example, a control device of a multi-phase rotary machine described in PTL 1 is disclosed.

In the conventional example described in PTL 1, a position sensor such as a resolver detects a rotor rotation position θ, and, on the basis of command voltages Vd1 and Vq1 and the rotor rotation position θ, a U-phase command voltage Vuu*1, a V-phase command voltage Vvu*1, and a W-phase command voltage Vwu*1 that are three-phase voltage command values are calculated.

CITATION LIST

Patent Literature

PTL 1: JP 4998836 B

SUMMARY OF INVENTION

Technical Problem

However, the conventional example of PTL 1 described above does not consider a case of failure in the position sensor for detecting the rotor rotation position, and therefore it is difficult to accurately drive and control the multi-phase rotary machine after a failure therein.

Accordingly, the present invention has been accomplished by focusing on the unsolved problem in the above conventional example, and it is an object of the present invention to provide a motor control device, an electric power steering device, and a vehicle that allow an electric motor to be accurately driven and controlled even when a failure occurs in a motor electric angle detection unit that detects a motor electric angle.

Solution to Problem

In order to achieve the object, a motor control device according to a first aspect of the present invention includes a motor electric angle initial value estimation unit that, when a motor electric angle detection unit that detects a motor electric angle of a multi-phase electric motor that generates a steering assist force is diagnosed as being abnormal in an initial diagnosis after a system restart, estimates an initial value of the motor electric angle on a basis of a response output of the multi-phase electric motor in response to input of a motor drive signal to the multi-phase electric motor; a motor electric angle estimation unit that estimates the motor electric angle on a basis of a steering angle detected by a steering angle detection unit that detects a steering angle of the steering and the initial value estimated by the motor electric angle initial value estimation unit; and a motor drive control unit that, when the motor electric angle detection unit is normal, drive-controls the multi-phase electric motor on a basis of the motor electric angle detected by the motor electric angle detection unit, and when the motor electric angle detection unit is diagnosed as being abnormal in the initial diagnosis after the system restart, drive-controls the multi-phase electric motor on a basis of a motor electric angle estimation value estimated by the motor electric angle estimation unit.

Additionally, an electric power steering device according to a second aspect of the present invention includes the motor control device according to the first aspect.

Furthermore, a vehicle according to a third aspect of the present invention includes the electric power steering device according to the second aspect.

Advantageous Effects of Invention

According to the present invention, when the motor electric angle detection unit is diagnosed as being abnormal in the initial diagnosis after a system restart, the initial value of the motor electric angle can be estimated on the basis of a response output of the multi-phase electric motor according to input of a motor drive signal to the multi-phase electric motor. Then, the motor electric angle can be estimated on the basis of the estimated initial value of the motor eclectic angle and a steering angle of the steering, and, on the basis of the motor electric angle estimation value, the multi-phase electric motor can be drive-controlled. Accordingly, even when abnormality occurs in the motor electric angle detection unit before or during a system shutdown, the multi-phase electric motor can be drive-controlled equivalently to when the motor electric angle detection unit is normal.

In addition, since the electric power steering device is formed by including the motor control device having the above advantageous effects, the multi-phase electric motor can be drive-controlled by the motor electric angle estimation value even when an abnormality occurs in the motor electric angle detection unit before or during a system shutdown, thereby allowing continuation of a steering assist function of the electric power steering device.

Furthermore, since the vehicle is formed by including the electric power steering device having the advantageous effect, continuation of the steering assist function of the electric power steering device becomes possible even when an abnormality occurs in the motor electric angle detection unit, so as to improve the reliability.

DESCRIPTION OF EMBODIMENTS

Next, first through third embodiments of the present invention will be described with reference to the drawings. In the following descriptions of the drawings, the same or similar parts are denoted by the same or similar reference signs. However, it is to be noted that the drawings are schematically illustrated, and thus dimensional relationships, ratios, and the like may be different from actual ones.

In addition, the first through the third embodiments represented below exemplify devices and methods for embodying the technical ideas of the present invention, and thus the technical idea of the present invention does not specify materials, shapes, structures, arrangements, and the like of constituent components to those described below. Various changes can be added to the technical ideas of the present invention within the technical scope defined by the appended claims.

First Embodiment (Structure)

Figure 1:
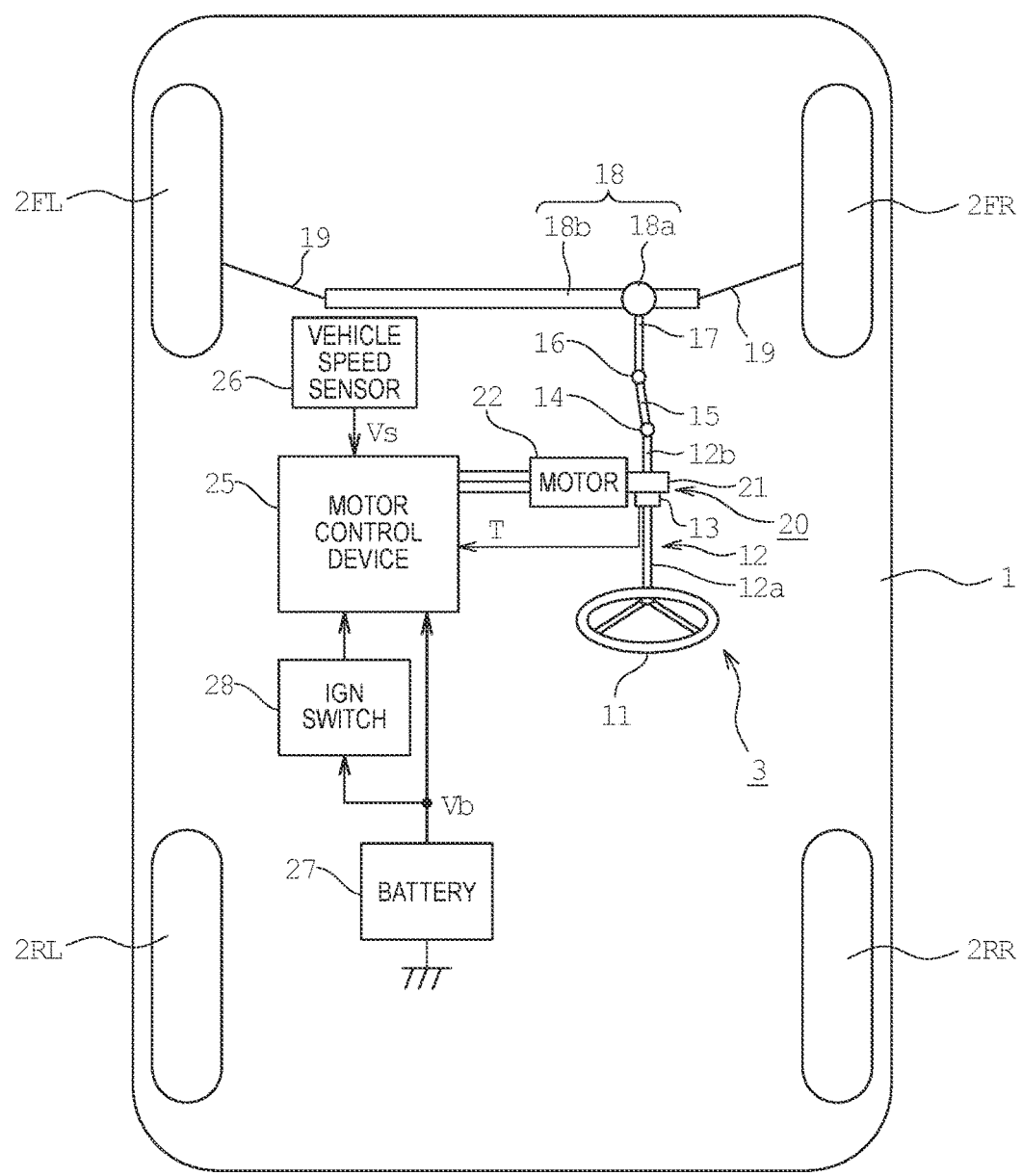
FIG. 1 is a diagram depicting one structural example of a vehicle according to a first embodiment of the present invention.

A vehicle 1 according to an embodiment of the present invention includes front wheels 2FR and 2FL serving as right and left steered wheels and rear wheels 2RR and 2RL, as depicted in FIG. 1. The front wheels 2FR and 2FL are steered by an electric power steering device 3.

The electric power steering device 3 includes a steering wheel 11, and a steering force applied to the steering wheel 11 from a driver is transmitted to a steering shaft 12. The steering shaft 12 includes an input shaft 12a and an output shaft 12b. One end of the input shaft 12a is connected to the steering wheel 11, and the other end thereof is connected to one end of the output shaft 12b via a steering torque sensor 13.

Then, the steering force transmitted to the output shaft 12b is transmitted to a lower shaft 15 via a universal joint 14, and is further transmitted to a pinion shaft 17 via a universal joint 16. The steering force transmitted to the pinion shaft 17 is transmitted to tie rods 19 via a steering gear 18 to steer the front wheels 2FR and 2FL serving as the steered wheels. Herein, the steering gear 18 is formed as a rack and pinion type including a pinion 18a connected to the pinion shaft 17 and a rack 18b engaged with the pinion 18a. Accordingly, the steering gear 18 converts a rotational movement transmitted to the pinion 18a to a translatory movement in a vehicle width direction by the rack 18b.

A steering assist mechanism 20 that transmits a steering assist force to the output shaft 12b is connected to the output shaft 12b of the steering shaft 12. The steering assist mechanism 20 includes a deceleration gear 21 which is formed by, for example, a worm gear mechanism and is connected to the output shaft 12b and a three-phase electric motor 22 that generates the steering assist force, that is connected to the deceleration gear 21, and that serves as a multi-phase electric motor formed by, for example, a three-phase brushless motor.

Figure 2:
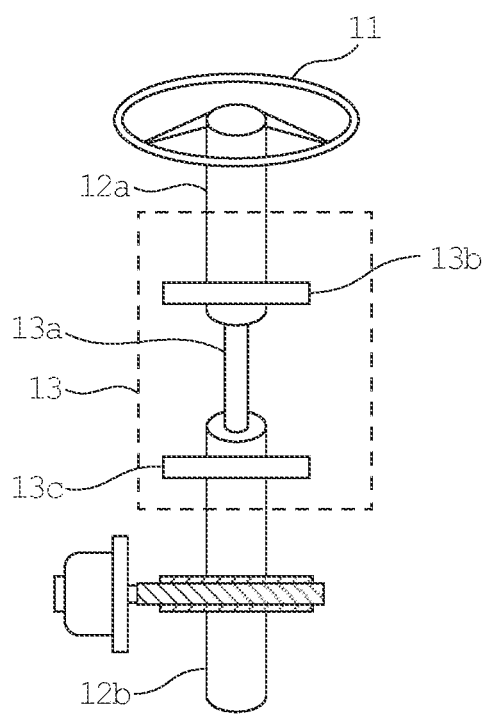
FIG. 2 is a schematic structural diagram depicting a steering torque sensor according to the first embodiment of the present invention.

The steering torque sensor 13 detects a steering torque that is applied to the steering wheel 11 and transmitted to the input shaft 12a. The steering torque sensor 13 is configured to convert the steering torque into a torsion angle displacement of an unillustrated torsion bar 13a interposed between the input shaft 12a and the output shaft 12b, convert the torsion angle displacement into an angular difference between an input-side rotation angle sensor 13b arranged on an input shaft 12a side and an output-side rotation angle sensor 13c arranged on an output shaft 12b side, and detect the angular difference, as depicted in FIG. 2.

Additionally, in the first embodiment, the input-side rotation angle sensor 13b and the output-side rotation angle sensor 13c are sensors that detect a relative rotation angle.

Figure 3:
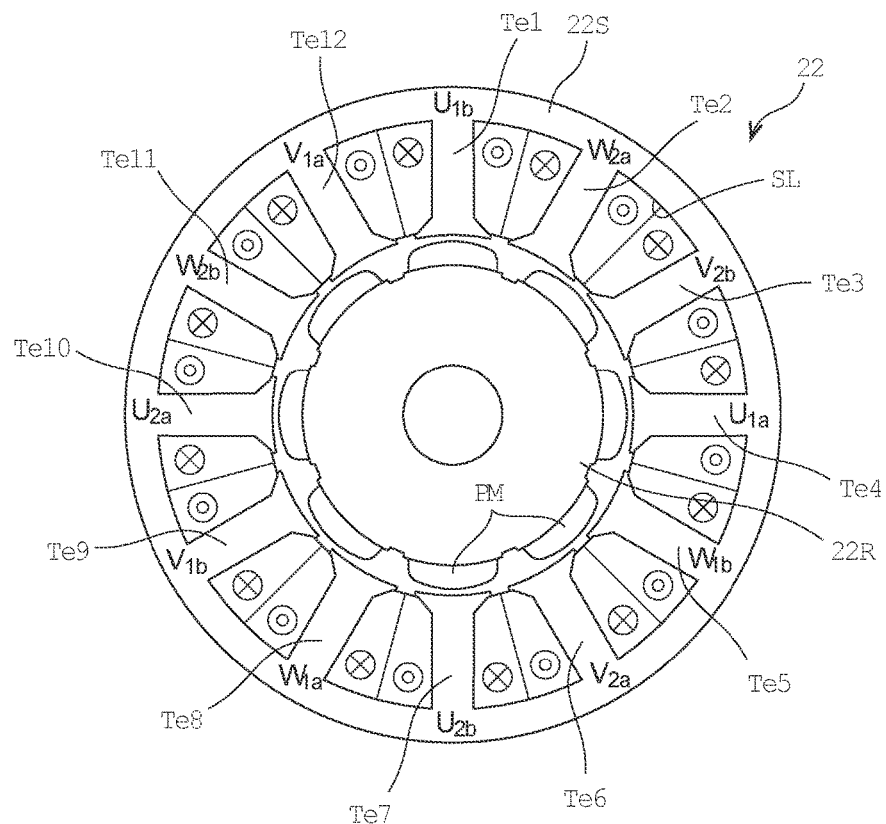
FIG. 3 is a sectional diagram depicting the structure of a three-phase electric motor according to the first embodiment of the present invention.

In addition, as depicted in FIG. 3, the three-phase electric motor 22 has the structure of a SPM motor that includes a stator 22S having teeth Te that are formed protrudingly inward on an inner peripheral surface thereof to form slots SL and serve as magnetic poles and a surface magnet type rotor 22R with eight poles that has permanent magnets PM on a surface thereof and is rotatably arranged to face the teeth Te on the inner peripheral side of the stator 22S. Herein, the number of the teeth Te of the stator 22S is set to the number of phases×2n (n represents an integer of 2 or more) where when, for example, n=2, the motor 22 has a structure with 8 poles and 12 slots.

Figure 4:
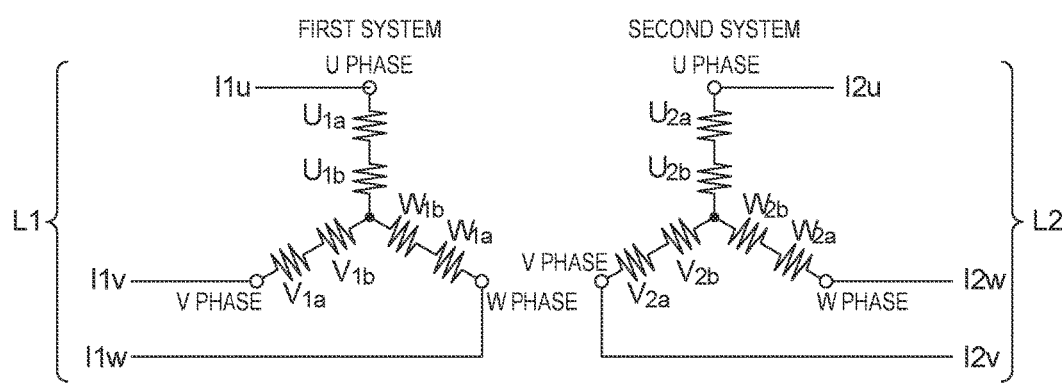
FIG. 4 is a schematic diagram depicting a winding structure of the three-phase electric motor of FIG. 3.

Then, in two systems depicted in FIG. 4, a first three-phase motor winding L1 and a second three-phase motor winding L2 are wounded on the slots SL of the stator 22S, and serve as multi-phase motor windings in which respective same-phase magnetic poles have the same phase with respect to the rotor magnet. In the first three-phase motor winding L1, respective one ends of U-phase coils U1a and U1b, V-phase coils V1a and V1b, and W-phase coils W1a and W1b are connected to each other to form a star connection. Furthermore, respective other ends of the U-phase coils U1a and U1b, the V-phase coils V1a and V1b, and the W-phase coils W1a and W1b are connected to a motor control device 25 to individually supply motor drive currents I1u, I1v, and I1w.

In addition, in the second three-phase motor winding L2, respective one ends of U-phase coils U2a and U2b, V-phase coils V2a and V2b, and W-phase coils W2a and W2b are connected to each other to form a star connection. Furthermore, respective other ends of the U-phase coils U2a and U2b, the V-phase coils V2a and V2b, and the W-phase coils W2a and W2b are connected to the motor control device 25 to individually supply motor drive currents I2u, I2v, and I2w.

Then, the respective phase coil portions U1a, U1b, V1a, V1b, W1a, and W1b of the first three-phase motor winding L1 and the respective phase coil portions U2a, U2b, V2a, V2b, W2a, and W2b of the second three-phase motor winding L2 are wound around the slots SL sandwiching the respective teeth Te in such a manner that energization current directions are the same.

In this manner, the respective phase coil portions U1a, U1b, V1a, V1b, W1a, and W1b of the first three-phase motor winding L1 and the respective phase coil portions U2a, U2b, V2a, V2b, W2a, and W2b of the second three-phase motor winding L2 are wound on mutually different 12 teeth Te1 to Te12. Specifically, on the 12 teeth Te1 to Te12, sequentially, the phase coils U1a, U1b, V1a, V1b, W1a, and W1b that serve as the first system are wound in a counter-clockwise direction and in the same winding direction in order, and next, the phase coils U2a, U2b, V2a, V2b, W2a, and W2b that serve as the second system are wound in the counter-clockwise direction and in the same winding direction in order. Furthermore, the phase coils U1a, U1b, V1a, V1b, W1a, and W1b serving as the first system are wound in the counter-clockwise direction and in the same winding direction in order, and lastly, the phase coils U2a, U2b, V2a, V2b, W2a, and W2b serving as the second system are wound in the counter-clockwise direction and in the same winding direction in order. Thus, the same-phase coil portions of the first three-phase motor winding L1 and the second three-phase motor winding L2 are wound thereon so as not to be simultaneously interlinked with the same magnetic flux formed by each magnetic pole permanent magnet PM of the rotor 22R. Accordingly, each coil portion of the first three-phase motor winding L1 and each coil portion of the second three-phase motor winding L2 form a magnetic circuit that suppresses mutual magnetic interference to a minimum level.

Figure 5:
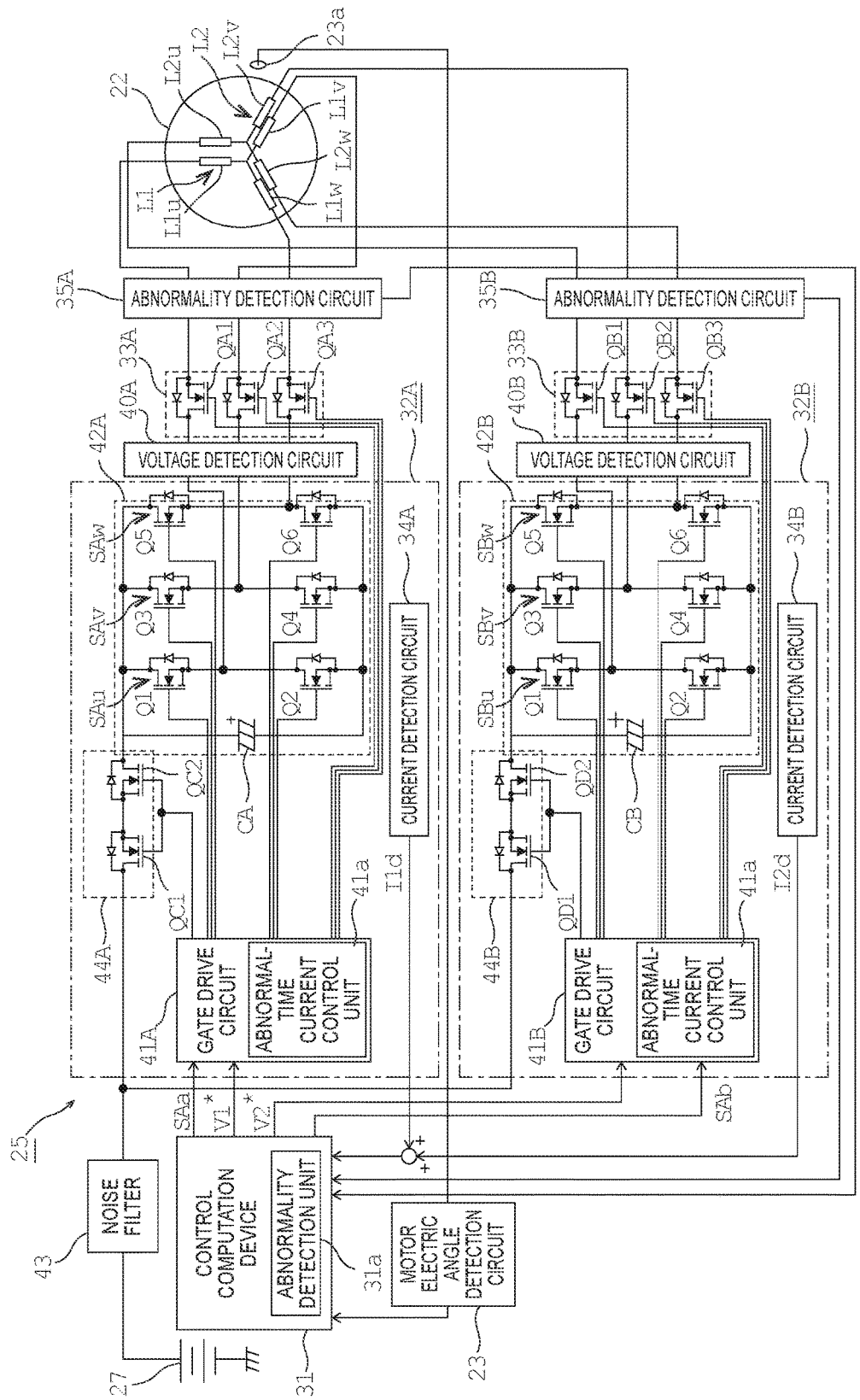
FIG. 5 is a circuit diagram depicting the specific structure of a motor control device according to the first embodiment of the present invention.

Furthermore, as depicted in FIG. 5, the three-phase electric motor 22 includes a rotation position sensor 23a formed by a resolver that detects a rotation position of the rotor. A detection value from the rotation position sensor 23a is supplied to a motor electric angle detection circuit 23, and the motor electric angle detection circuit 23 detects a motor electric angle θm. Hereinafter, the rotation position sensor 23a may be described as "resolver 23a". In addition, the rotation position sensor 23a is not limited to the resolver, and, for example, may be formed by another sensor such as a rotary encoder.

A steering torque T detected by the steering torque sensor 13 and a vehicle speed Vs detected by a vehicle speed sensor 26 are input to the motor control device 25, and also, the motor electric angle θm output from the motor electric angle detection circuit 23 is input the motor control device 25.

Additionally, a direct current from a battery 27 as a direct current source is input to the motor control device 25. Herein, a negative electrode of the battery 27 is grounded, whereas a positive electrode thereof is connected to the motor control device 25 via an ignition switch 28 (hereinafter may be described as "IGN switch 28") that starts engine and also is directly connected to the motor control device 25 not via the IGN switch 28.

A specific structure of the motor control device 25 is formed as depicted in FIG. 5. Specifically, the motor control device 25 includes a control computation device 31 that computes a motor current command value, first and second motor drive circuits 32A and 32B to which the motor current command value output from the control computation device 31 is individually input, and first and second motor current block circuits 33A and 33B interposed between output sides of the first and second motor drive circuits 32A and 32B and the first and second three-phase motor windings L1 and L2 of the three-phase electric motor 22.

Although the depiction is omitted in FIG. 5, the steering torque T detected by the steering torque sensor 13 and the vehicle speed Vs detected by the vehicle speed sensor 26 depicted in FIG. 1 are input to the control computation device 31, and also, as depicted in FIG. 5, the motor electric angle θm output from the motor electric angle detection circuit 23 is input to the control computation device 31. Furthermore, motor currents I1m (I1mu, I1mv, and I1mw) and I2m (I2mu, I2mv, and I2mw) output from current detection circuits 34A and 34B, which are output from the coils of the respective phases of the first three-phase motor winding L1 and the second three-phase motor winding L2 of the three-phase electric motor 22, are input thereto.

Hereinafter, when it is unnecessary to distinguish the motor currents I1m from I2m, detection values thereof may be sometimes described as "motor current detection values Im (Imu, Imv, and Imw)".

Additionally, as depicted in FIG. 5, motor phase voltages V1m (V1mu, V1mv, and V1mw) and V2m (V2mu, V2mv, and V2mw) detected by voltage detection circuits 40A and 40B interposed between the first and second motor drive circuits 32A and 32B and the first and second motor current block circuits 33A and 33B are input to the control computation device 31.

Hereinafter, when it is unnecessary to distinguish between the motor phase voltages V1m and V2m, detection values thereof may be described as "motor voltage detection values Vm (Vmu, Vmv, and Vmw)".

Figure 6:
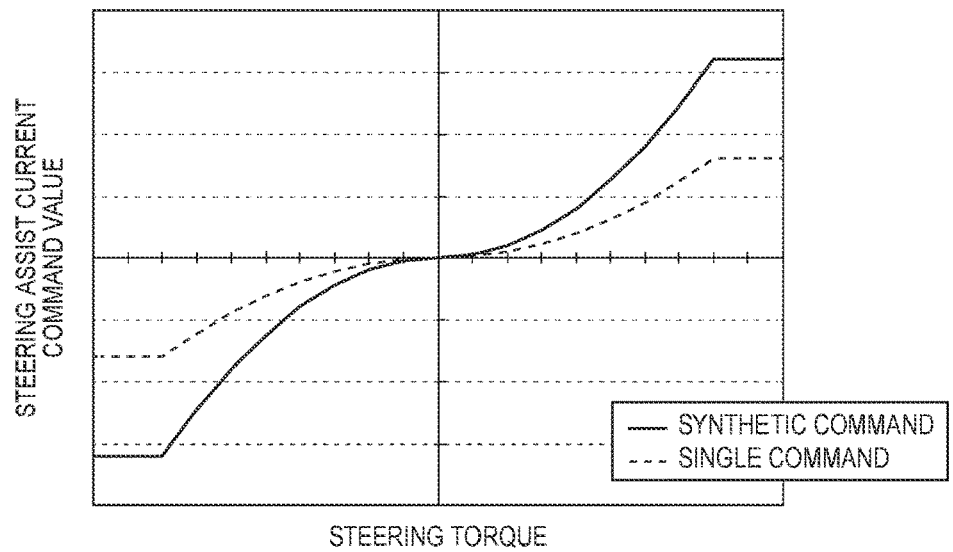
FIG. 6 is a characteristic diagram depicting a relationship between normal-time steering torque and steering assist current command value.
Figure 7:
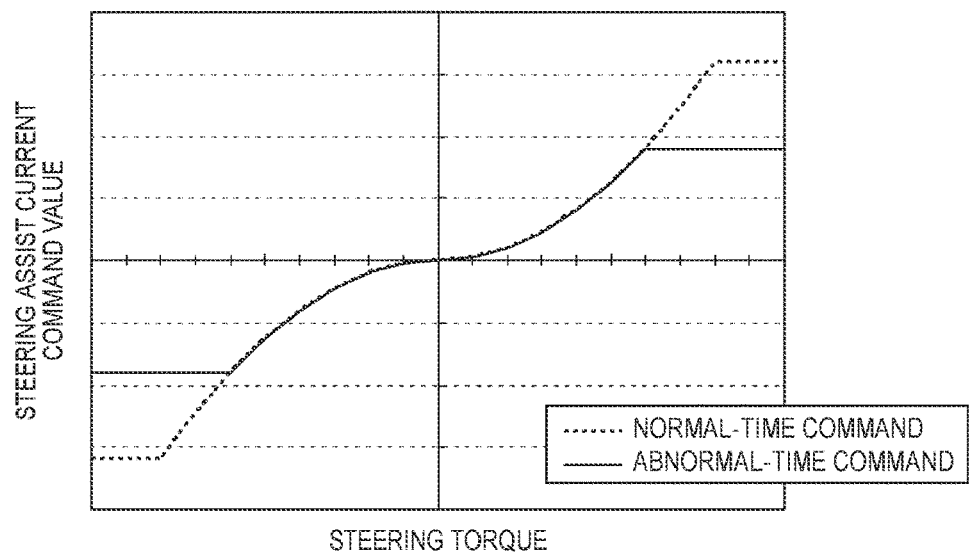
FIG. 7 is a characteristic diagram depicting a relationship between abnormal-time steering torque and steering assist current command value.

When the first and second motor drive circuits 32A and 32B are normal, the control computation device 31 calculates steering assist current command values I1* and I2* by referring to a normal-time steering assist current command value calculation map which is depicted in FIG. 6 and is set in advance on the basis of the steering torque T and the vehicle speed Vs. In addition, when the first and second motor drive circuits 32A or 32B are abnormal, the control computation device 31 calculates the steering assist current command values I1* and I2* by referring to an abnormal-time steering assist current command value calculation map which is depicted in FIG. 7 and is set in advance on the basis of the steering torque T and the vehicle speed Vs.

In addition, on the basis of the calculated steering assist current command values I1* and I2* and the motor electric angle θm, the control computation device 31 calculates a target d-axis current command value Id* and a target q-axis current command value Iq* of a d-q coordinate systems. Additionally, the control computation device 31 performs a d-q phase to three phase conversion of the calculated d-axis current command value Id* and q-axis current command value Iq* to calculate a U-phase current command value Iu*, a V-phase current command value Iv*, and a W-phase current command value Iw*. Then, the control computation device 31 calculates current deviations ΔIu, ΔIv, and ΔIw between the calculated U-phase current command value Iu*, V-phase current command value Iv*, and W-phase current command value Iw* and added values of the current detection values of each phase detected by the current detection circuits 34A and 34B. Still furthermore, the control computation device 31 performs, for example, PI control computation or PID control computation of the calculated current deviations ΔIu, ΔIv, and ΔIw to calculate voltage command values V1* and V2* of the three phases for the first and second motor drive circuits 32A and 32B. Then, the control computation device 31 outputs the calculated voltage command values V1* and V2* of the three phases to the first and second motor drive circuits 32A and 32B.

In addition, the motor current detection values I1mu, I1mv, I1mw, I2mu, I2mu, and I2mw detected by first and second abnormality detection circuits 35A and 35B interposed between the first and second motor current block circuits 33A and 33B and the first and second three-phase motor windings L1 and L2 of the three-phase electric motor 22 are input to the control computation device 31.

The control computation device 31 compares the motor current detection values I1mu to I1mw and I2mu to I2mw for receiving with the respective phase current command values Iu*, Iv*, and Iw* calculated by itself. Then, the control computation device 31 includes an abnormality detection unit 31a that, on the basis of results of the comparison, detects an open-circuit failure and a short-circuit failure of field effect transistors (FETs) Q1 to Q6 as switching elements that form first and second inverter circuits 42A and 42B that will be described later.

When detecting an open-circuit failure or a short-circuit failure of the field effect transistors (FETs) forming the first and second inverter circuits 42A and 42B, the abnormality detection unit 31a outputs an abnormality detection signal SAa or SAb having a logical value of "1" to a gate drive circuit 41A or 41B of the first and second motor drive circuits 32A or 32B in which the abnormality has been detected.

The first and second motor drive circuits 32A and 32B, respectively, include the gate drive circuits 41A and 41B having an abnormal-time current control unit 41a and the first and second inverter circuits 42A and 42B.

The voltage command values V1* and V2* of the three phases output from the control computation device 31 are input to the gate drive circuits 41A and 41B. Then, the gate drive circuits 41A and 41B form gate signals on the basis of the input voltage command values V1* and V2* of the three phases.

The gate signals output from the gate drive circuits 41A and 41B are input to the first and second inverter circuits 42A and 42B. Then, the first and second inverter circuits 42A and 42B supply drive currents to the three-phase electric motor 22 on the basis of the input gate signals.

When the voltage command values V1* and V2* are input from the control computation device 31, the gate drive circuits 41A and 41B, respectively, form six gate signals by pulse width modulation (PWM) based on the voltage command values V1* and V2* and a triangular wave carrier signal Sc. Then, the gate drive circuits 41A and 41B output the gate signals to the first and second inverter circuits 42A and 42B.

In addition, when the abnormality detection signal SAa input from the control computation device 31 has a logical value of "0" (normal), the gate drive circuit 41A outputs three high-level gate signals to the first motor current block circuit 33A. In addition, the gate drive circuit 41A outputs two high-level gate signals to the first power supply block circuit 44A. Furthermore, when the abnormality detection signal SAa has the logical value of "1" (abnormal), the gate drive circuit 41A causes the abnormal-time current control unit 41a to simultaneously output three low-level gate signals to the first motor current block circuit 33A to block motor current, and additionally, to simultaneously output two low-level gate signals to the first power supply block circuit 44A to block battery power.

Similarly, when the abnormality detection signal SAb input from the control computation device 31 has the logical value of "0" (normal), the gate drive circuit 41B outputs three high-level gate signals to the second motor current block circuit 33B, and additionally outputs two high-level gate signals to the second power supply block circuit 44B. Furthermore, when the abnormality detection signal SAb has the logical value of "1" (abnormal), the gate drive circuit 41B causes the abnormal-time current control unit 41a to simultaneously output three low-level gate signals to the second motor current block circuit 33B to block motor current, and additionally, to simultaneously output two low-level gate signals to the second power supply block circuit 44B to block battery power.

A battery current of the battery 27 is input to each of the first and second inverter circuits 42A and 42B via a noise filter 43 and the first and second power supply block circuits 44A and 44B, and smoothing electrolytic capacitors CA and CB are connected to input sides thereof.

The first and second inverter circuits 42A and 42B include the field effect transistors (FETs) Q1 to Q6 as the six switching elements, and have a structure in which three switching arms SAu, SAv, and SAw each having two field effect transistors connected in series are connected in parallel. Then, the gate signals output from the gate drive circuits 41A and 41B are input to gates of the respective field effect transistors Q1 to Q6. Accordingly, a U-phase current Iu, a V-phase current Iv, and a W-phase current Iw are output from among the field effect transistors of the respective switching arms SAu, SAv, and SAw to the first and second three-phase motor windings L1 and L2 of the three-phase electric motor 22 via the first and second motor current block circuits 33A and 33B.

In addition, although unillustrated, a voltage across a shunt resistance interposed between each of the switching arms SAu, SAv, and SAw of the first and second inverter circuits 42A and 42B and a ground is input to the current detection circuits 34A and 34B. Then, the current detection circuits 34A and 34B detect the motor currents I1m (I1mu to I1mw) and I2m (I2mu to I2mw).

Additionally, the first motor current block circuit 33A includes three current blocking field effect transistors QA1, QA2, and QA3. A source of the field effect transistor QA1 is connected to a connection point of the field effect transistors Q1 and Q2 of the switching arm SAu of the first inverter circuit 42A, and a drain thereof is connected to a U-phase coil L1u of the first three-phase motor winding L1 via the first abnormality detection circuit 35A. Additionally, a source of the field effect transistor QA2 is connected to a connection point of the field effect transistors Q3 and Q4 of the switching arm SAv of the first inverter circuit 42A, and a drain thereof is connected to a V-phase coil L1v of the first three-phase motor winding L1 via the first abnormality detection circuit 35A. Furthermore, a source of the field effect transistor QA3 is connected to a connection point of the field effect transistors Q5 and Q6 of the switching arm SAw of the first inverter circuit 42A, and a drain thereof is connected to a W-phase coil L1w of the first three-phase motor winding L1 via the first abnormality detection circuit 35A.

Additionally, the second motor current block circuit 33B includes three current blocking field effect transistors QB1, QB2, and QB3. A source of the field effect transistor QB1 is connected to a connection point of the field effect transistors Q1 and Q2 of the switching arm SBu of the second inverter circuit 42B, and a drain thereof is connected to a U-phase coil L2u of the second three-phase motor winding L2 via the second abnormality detection circuit 35B. Additionally, a source of the field effect transistor QB2 is connected to a connection point of the field effect transistors Q3 and Q4 of the switching arm SBv of the second inverter circuit 42B, and a drain thereof is connected to a V-phase coil L2v of the second three-phase motor winding L2 via the second abnormality detection circuit 35B. Furthermore, a source of the field effect transistor QB3 is connected to a connection point of the field effect transistors Q5 and Q6 of the switching arm SBw of the second inverter circuit 42B, and a drain thereof is connected to a W-phase coil L2w of the second three-phase motor winding L2 via the second abnormality detection circuit 35B.

Then, the field effect transistors QA1 to QA3 and QB1 to QB3, respectively, of the first and second motor current block circuits 33A and 33B are connected in the same direction in such a manner that cathodes of parasitic diodes D thereof face sides where the first and second inverter circuits 42A and 42B are arranged.

In addition, the first and second power supply block circuits 44A and 44B, respectively, have a series circuit structure in which drains of two field effect transistors (FETs) QC1, QC2 and QD1, QD2 are connected to each other and the parasitic diodes are oriented in opposite directions. Then, sources of the field effect transistors QC1 and QD1 are connected to each other and connected to an output side of the noise filter 43. Furthermore, sources of the field effect transistors QC2 and QD2 are connected to sources of the respective field effect transistors Q1, Q2, and Q3 of the first and second inverter circuits 42A and 42B.

(Motor Electric Angle Detection Circuit 23)

Next, a description will be given of a specific structure of the motor electric angle detection circuit 23 according to the first embodiment.

Figure 8:
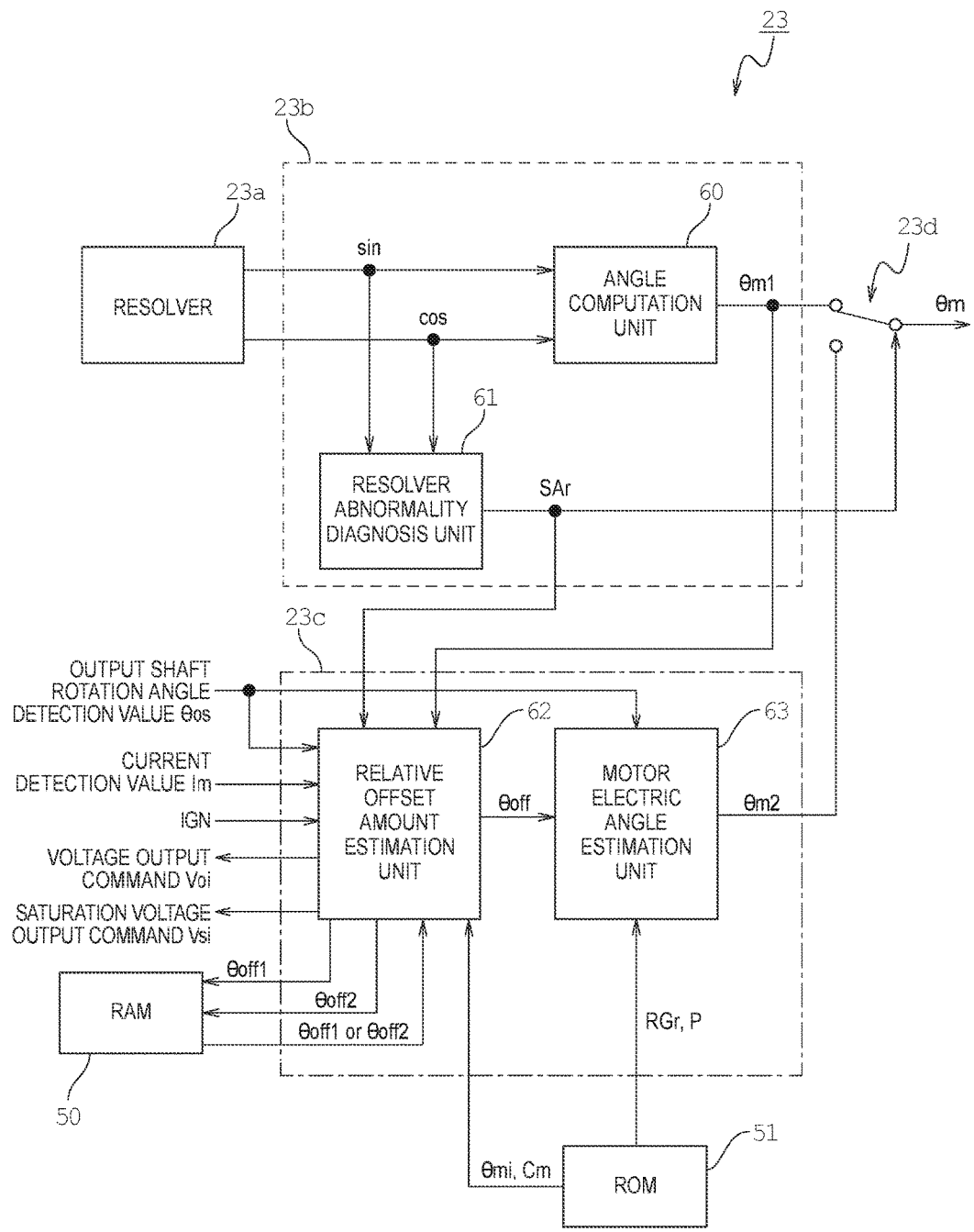
FIG. 8 is a block diagram depicting the specific structure of a motor electric angle detection circuit according to the first embodiment of the present invention.

The motor electric angle detection circuit 23 of the first embodiment includes a main motor electric angle detection circuit 23b, a sub motor electric angle detection circuit 23c, an electric angle selection unit 23d, a RAM 50, and a ROM 51, as depicted in FIG. 8.

The main motor electric angle detection circuit 23b includes an angle computation unit 60 and a resolver abnormality diagnosis unit 61.

The angle computation unit 60 computes a first motor electric angle $\theta m1$ on the basis of a sin signal and a cos signal according to a rotation angle of the three-phase electric motor 22 output from the resolver 23a. Then, the angle computation unit 60 outputs the computed first motor electric angle $\theta m1$ to the electric angle selection unit 23d.

The resolver abnormality diagnosis unit 61 detects abnormality in the resolver 23a and outputs an abnormality detection signal SAr.

In addition, although the depiction is omitted in FIG. 5, an output shaft rotation angle detection value $\theta os$ output from the output-side rotation angle sensor 13c and the current detection values Im output from the current detection circuits 34A and 34B are input to the sub motor electric angle detection circuit 23c. Furthermore, an ignition signal IGN indicating ON/OFF of the IGN switch 28 output from the IGN switch 28, the first motor electric angle $\theta m1$ from the angle computation unit 60, and the abnormality detection signal SAr from the resolver abnormality diagnosis unit 61 are input thereto.

The sub motor electric angle detection circuit 23c includes a relative offset amount estimation unit 62 and a motor electric angle estimation unit 63.

The relative offset amount estimation unit 62 estimates a relative offset amount $\theta off$ between an origin $\theta md$ of the motor electric angle $\theta m$ (hereinafter may be described as "motor electric angle origin $\theta md$") and a reference value $\theta osr$ of the output shaft rotation angle detection value $\theta os$. Then, the estimated relative offset amount $\theta off$ is output to the motor electric angle estimation unit 63.

The motor electric angle estimation unit 63 reads, from the ROM 51, a deceleration ratio RGr of the deceleration gear 21 and the number P of pole pairs of the rotor 22R of the three-phase electric motor 22 that are stored in advance. Then, on the basis of the read deceleration ratio RGr and the number P of pole pairs, the output shaft rotation angle detection value $\theta os$ detected by the output-side rotation angle sensor 13c, and the relative offset amount $\theta off$ estimated by the relative offset amount estimation unit 62, the motor electric angle estimation unit 63 calculates a motor electric angle estimation value $\theta me$. Furthermore, the motor electric angle estimation unit 63 outputs the calculated motor electric angle estimation value $\theta me$ as a second motor electric angle $\theta m2$ to the electric angle selection unit 23d.

Specifically, the motor electric angle estimation unit 63 calculates the motor electric angle estimation value $\theta me$ according to the following formula (1):

$$\theta me = \theta os \times RGr \times P + \theta off \qquad (1)$$

In other words, the output shaft rotation angle detection value $\theta os$ is multiplied by the deceleration ratio RGr and the number P of pole pairs, and then, the relative offset amount $\theta off$ is added to a result of the multiplication, thereby calculating the motor electric angle estimation value $\theta me$.

The electric angle selection unit 23d selects the first motor electric angle $\theta m1$ output from the main motor electric angle detection circuit 23b when the abnormality detection signal SAr output from the resolver abnormality diagnosis unit 61 of the main motor electric angle detection circuit 23b has the logical value of "0" representing the absence of abnormality. Then, the selected first motor electric angle $\theta m1$ is output as the motor electric angle $\theta m$ to the above-described control computation device 31. On the other hand, when the abnormality detection signal SAr has the logical value of "1" representing the presence of abnormality, the electric angle selection unit 23d selects the second motor electric angle $\theta m2$ output from the sub motor electric angle detection circuit 23c. Then, the selected second motor electric angle $\theta m2$ is output as the motor electric angle $\theta m$ to the control computation device 31.

(Relative Offset Amount Estimation Unit 62)

Next, a description will be given of a specific structure of the relative offset amount estimation unit 62 according to the first embodiment.

Figure 9:
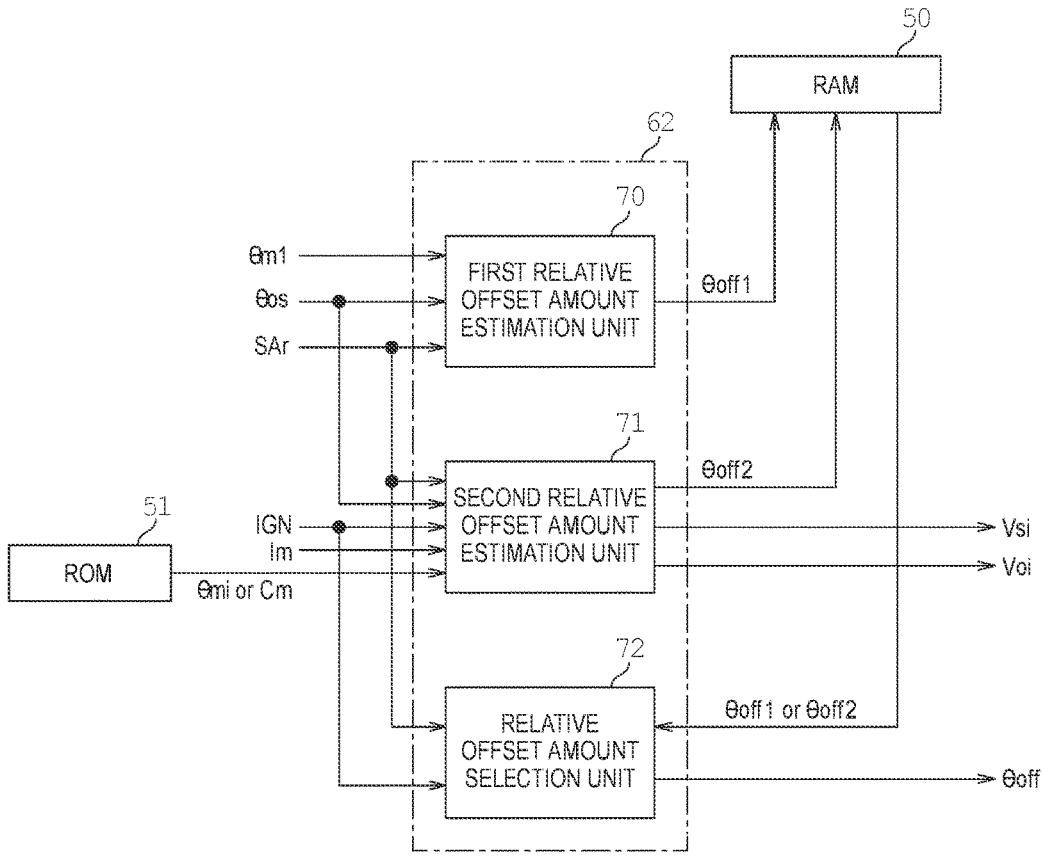
FIG. 9 is a block diagram depicting the specific structure of a relative offset amount estimation unit according to the first embodiment of the present invention.

The relative offset amount estimation unit 62 of the first embodiment includes a first relative offset amount estimation unit 70, a second relative offset amount estimation unit 71, and a relative offset amount selection unit 72, as depicted in FIG. 9.

When the resolver 23a and the angle computation unit 60 are normal, the first relative offset amount estimation unit 70 estimates a first relative offset amount $\theta off1$ on the basis of the output shaft rotation angle detection value θos detected by the output-side rotation angle sensor 13c and the motor electric angle detection value θm1 detected by the main motor electric angle detection circuit 23b. Then, the estimated first relative offset amount θoff1 is stored in the RAM 50.

Herein, when the resolver 23a and the angle computation unit 60 are normal, the motor electric angle origin θmd is known, and therefore it is possible to easily estimate a relative offset amount with respect to the reference value θosr of the output shaft rotation angle.

In addition, the reference value θosr is obtained by multiplying an output shaft rotation angle detection value upon system start (at a time when the IGN switch 28 is turned ON from an OFF state) by the number P of pole pairs and the deceleration ratio RGr.

Figure 10:
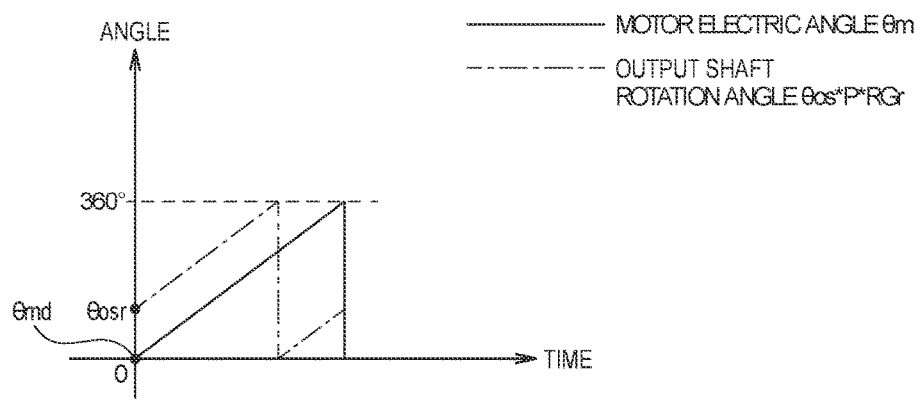
FIG. 10 is a waveform diagram depicting a relationship between the origin of motor electric angle and a reference value of output shaft rotation angle.

Additionally, in order to complement the motor electric angle θm by output shaft rotation angle detection value θos*P*RGr, it is necessary to make the motor electric angle origin θmd (0 degrees) coincident with the reference value θosr of the output shaft rotation angle. For example, as depicted in FIG. 10, when the reference value θosr is not coincident with the origin θmd, an angle error occurs in the output shaft rotation angle detection value θos*P*RGr (amount of displacement from reference value θosr) with respect to the motor electric angle θm indicated by a solid line in the drawing, as indicated by a dot-and-dash line in the drawing. Due to that, a significant deviation will occur with respect to an actual motor electric angle θm.

Accordingly, it is necessary to obtain in advance, as a relative offset amount, how much the reference value θosr of the output shaft rotation angle deviates with respect to the motor electric angle origin θmd and add the relative offset amount (correct with the relative offset amount) when estimating the motor electric angle.

The second relative offset amount estimation unit 71 estimates a second relative offset amount θoff2 when the abnormality detection signal SAr has the value representing the presence of abnormality in an initial diagnosis by the resolver abnormality diagnosis unit 61 after a system restart in which the IGN switch 28 is again turned ON from a system stop in which the ING switch 28 is in an OFF state. Then, the estimated second relative offset amount θoff2 is stored in the RAM 50. In addition, the resolver abnormality diagnosis unit 61 of the first embodiment is configured to perform diagnosis immediately after the IGN switch 28 is turned on and the system starts.

Herein, in a case where, for example, the resolver 23a has had a failure during a previous system start or a failure has occurred, for example, in the resolver 23a during the system stop, the resolver 23a is diagnosed as being abnormal in an initial diagnosis after the present system start. In this case, all angle data and the like obtained during the previous system start will be lost. Additionally, there is also a case where a driver operates the steering wheel 11 during a system stop.

Accordingly, when the resolver 23a is diagnosed as being abnormal in an initial diagnosis after a system restart, it is necessary to estimate the motor electric angle origin θmd and estimate the second relative offset amount θoff2 on the basis of the estimated motor electric angle origin θmd.

(Second Relative Offset Amount Estimation Unit 71)

Next, a description will be given of a specific structure of the second relative offset amount estimation unit 71 according to the first embodiment.

Figure 11:
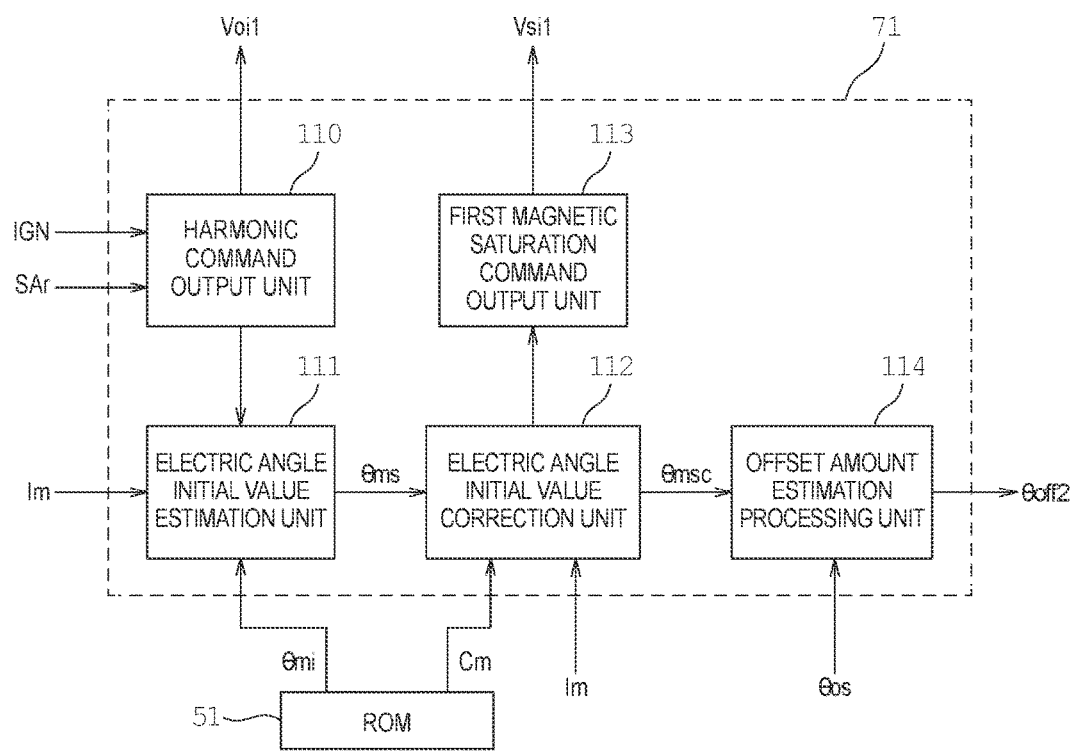
FIG. 11 is a block diagram depicting the specific structure of a second relative offset amount estimation unit according to the first embodiment of the present invention.

The second relative offset amount estimation unit 71 of the first embodiment includes a harmonic command output unit 110, an electric angle initial value estimation unit 111, an electric angle initial value correction unit 112, a first magnetic saturation command output unit 113, and an offset amount estimation processing unit 114, as depicted in FIG. 11.

The harmonic command output unit 110 outputs a first voltage output command Voi1 to the control computation device 31 when the abnormality detection signal SAr has the value representing the presence of abnormality in the initial diagnosis after the system restart. Herein, the first voltage output command Voi1 is an output command for a harmonic voltage command at such a level that the rotor 22R of the three-phase electric motor 22 does not rotate and no magnetic saturation occurs in the stator 22S.

The control computation device 31 of the first embodiment generates a voltage command for energization with a harmonic voltage according to input of the first voltage output command Voi1, and outputs the generated voltage command to the gate drive circuits 41A and 41B. In this way, energization with harmonic voltage to the three-phase electric motor 22 is performed via the first and second inverter circuits 42A and 42B.

The electric angle initial value estimation unit 111 acquires, via the current detection circuits 34A and 34B, the current detection value Im of a current that flows to the three-phase electric motor 22 in response to application of the harmonic voltage, and detects a first current peak value Imp1 that is a peak value of the acquired current detection value Im.

Herein, in response to the application of the harmonic voltage, a current which is dependent on the motor electric angle θm flows to the three-phase electric motor 22. Specifically, the first current peak value Imp1 as the peak value of the above-mentioned current has information of the motor electric angle.

Thus, in the first embodiment, a relationship between the first current peak value Imp1 and information θmi of the motor electric angle θm (hereinafter may be described as "motor electric angle information θmi") is prepared as a map in advance, and the map (hereinafter may be described as "electric angle information map") is stored in the ROM 51.

The electric angle initial value estimation unit 111 reads the motor electric angle information θmi by referring to the electric angle information map stored in the ROM 51 from the detected first current peak value Imp1, and estimates a motor electric angle initial value θms on the basis of the read motor electric angle information θmi. Then, the estimated motor electric angle initial value θms is output to the electric angle initial value correction unit 112.

In response to the input of the motor electric angle initial value θms, the electric angle initial value correction unit 112 outputs an output command for a voltage command (hereinafter may be described as "first magnetic saturation voltage command") which is large to the extent that the rotor 22R of the three-phase electric motor 22 does not rotate and magnetic saturation occurs in the stator 22S to the first magnetic saturation command output unit 113.

The first magnetic saturation command output unit 113 outputs a first saturation voltage output command Vsi1 that is an output command for the first magnetic saturation voltage command to the control computation device 31 in response to the output command from the electric angle initial value correction unit 112.

The control computation device 31 of the first embodiment generates the first magnetic saturation voltage command in response to the input of the first saturation voltage output command Vsi1, and outputs the generated first magnetic saturation voltage command to the gate drive circuits 41A and 41B. In this way, the energization to the three-phase electric motor 22 with a harmonic voltage which is large to the extent that magnetic saturation occurs (hereinafter may be described as "first magnetic saturation voltage") is performed via the first and second inverter circuits 42A and 42B.

The electric angle initial value correction unit 112 acquires, via the current detection circuits 34A and 34B, the current detection value Im of a current that flows to the three-phase electric motor 22 in response to the application of the first magnetic saturation voltage, and detects a second current peak value Imp2 that is a peak value of the acquired current detection value Im.

Herein, even in the case of application of the first magnetic saturation voltage, a current which is dependent on the motor electric angle θm flows to the three-phase electric motor 22. The magnitude of a vector of the current has a feature that the magnitude of the vector is larger when oriented in a north pole direction than when oriented in a south pole direction. In other words, the second current peak value Imp2 of the current has information for discriminating the directions (the north pole direction and the south pole direction) in which the vector of the first current peak value Imp1 is oriented, and the motor electric angle initial value θms can be corrected on the basis of the information.

Thus, in the first embodiment, a relationship between the second current peak value Imp2 and correction information Cm of the motor electric angle initial value θms (hereinafter may be described as "motor electric angle correction information Cm") is prepared as a map in advance, and the map (hereinafter may be described as "correction information map") is stored in the ROM 51.

The electric angle initial value correction unit 112 reads the motor electric angle correction information Cm by referring to the correction information map stored in the ROM 51 from the detected second current peak value Imp2, and corrects the motor electric angle initial value θms on the basis of the read motor electric angle correction information Cm. Then, a corrected motor electric angle initial value θmsc is output to the offset amount estimation processing unit 114.

The offset amount estimation processing unit 114 estimates the motor electric angle origin θmd on the basis of the corrected motor electric angle initial value θmsc, and estimates the second relative offset amount θoff2 on the basis of the motor electric angle origin θmd and the reference value θosr of the output shaft rotation angle at the time of a system restart. Then, the estimated second relative offset amount θoff2 is stored in the RAM 50.

When the abnormality detection signal SAr has the value representing the presence of abnormality while system is running, the relative offset amount selection unit 72 selects the first relative offset amount θoff1, whereas when the abnormality detection signal SAr has the value representing the presence of abnormality in an initial diagnosis after a system restart, the relative offset amount selection unit 72 selects the second relative offset amount θoff2. Then, the relative offset amount selection unit 72 reads, from the RAM 50, either one selected from the first relative offset amount θoff1 and the second relative offset amount θoff2, and outputs the selected relative offset amount as the relative offset amount θoff to the motor electric angle estimation unit 63.

(Operation)

Next, operation of the first embodiment will be described.

In an operation stopped state in which the IGN switch 28 is in an OFF state and thus the vehicle 1 is stopped, and also the steering assist control processing is stopped, the control computation device 31 and the motor electric angle detection circuit 23 of the motor control device 25 are in a non-operation state.

Due to this, various kinds of processing to be executed by the control computation device 31 and the motor electric angle detection circuit 23 are stopped. In this state, the three-phase electric motor 22 is out of operation, and thus output of a steering assist force to the steering mechanism is stopped.

When the IGN switch 28 is turned on from the operation stopped state, the control computation device 31 and the motor electric angle detection circuit 23 are brought into an operation state and start various kinds of processing such as processing for detecting the motor electric angle θm and steering assist control processing. At this time, it is assumed that the resolver 23a and the angle computation unit 60 are normal.

In this case, the abnormality detection signal SAr has the value representing the absence of abnormality, and the electric angle selection unit 23d outputs, as the motor electric angle θm, the first motor electric angle θm1 computed by the angle computation unit 60 to the control computation device 31.

On the basis of the motor electric angle θm, the control computation device 31 calculates the d-axis current command value Id* and the q-axis current command value Iq*. Then, on the basis of the d-axis current command value Id* and the q-axis current command value Iq*, the control computation device 31 calculates the three-phase voltage command values V1* and V2* for the first and second motor drive circuits 32A and 32B, and outputs the calculated three-phase voltage command values V1* and V2* to the first and second motor drive circuits 32A and 32B. Accordingly, the first and second motor drive circuits 32A and 32B drive-control the first and second inverter circuits 42A and 42B, thereby drive-controlling (controlling commutation of) the three-phase electric motor 22.

On the other hand, when the resolver 23a and the angle computation unit 60 are normal, the relative offset amount estimation unit 62 of the sub motor electric angle detection circuit 23c performs processing for estimating the first relative offset amount θoff1. Specifically, on the basis of the output shaft rotation angle detection value θos detected by the output-side rotation angle sensor 13c and the motor electric angle θm output from the main motor electric angle detection circuit 23b at the normal time, the first relative offset amount θoff1 is estimated, and the estimated first relative offset amount θoff1 is stored in the RAM 50.

Then, when the resolver 23a and the angle computation unit 60 are normal, the relative offset amount estimation unit 62 of the first embodiment outputs the first relative offset amount θoff1 stored in the RAM 50 as the relative offset amount θoff to the motor electric angle estimation unit 63.

The motor electric angle estimation unit 63 calculates, when the resolver 23a and the angle computation unit 60 are normal, the motor electric angle estimation value θme from the output shaft rotation angle detection value θos detected by the output-side rotation angle sensor 13c, the first relative offset amount θoff1, the deceleration ratio RGr (for example, 20.5), and magnetic pole pairs (for example, 4). Then, the motor electric angle estimation value θme is output as the second motor electric angle θm2 to the electric angle selection unit 23d.

After that, when a failure occurs in at least one of the resolver 23a and the angle computation unit 60 while system is running and the abnormality detection signal SAr has the value representing the presence of abnormality, the electric angle selection unit 23d outputs, as the motor electric angle θm, the second motor electric angle θm2 input from the sub motor electric angle detection circuit 23c to the control computation device 31.

Accordingly, the control computation device 31 drive-controls (controls commutation of) the three-phase electric motor 22 on the basis of the second motor electric angle θm2 estimated by the sub motor electric angle detection circuit 23c.

Subsequently, it is assumed that the IGN switch 28 is once turned off and the system is stopped, and after that, the IGN switch 28 is turned on again and the system is restarted.

In this case, the abnormality detection signal SAr has the value representing the presence of abnormality due to an initial diagnosis by the resolver abnormality diagnosis unit 61 after the system restart, and the relative offset amount estimation unit 62 performs processing for estimating the second relative offset amount θoff2.

Figure 12A:
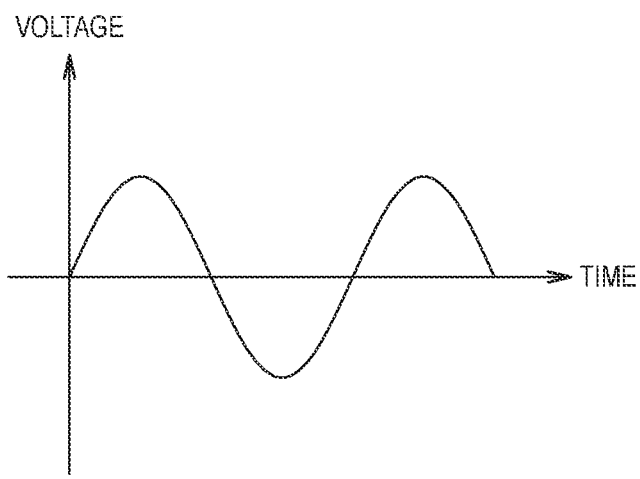
FIG. 12A is a waveform diagram depicting one example of a harmonic voltage that is applied to the three-phase electric motor.
Figure 12B:
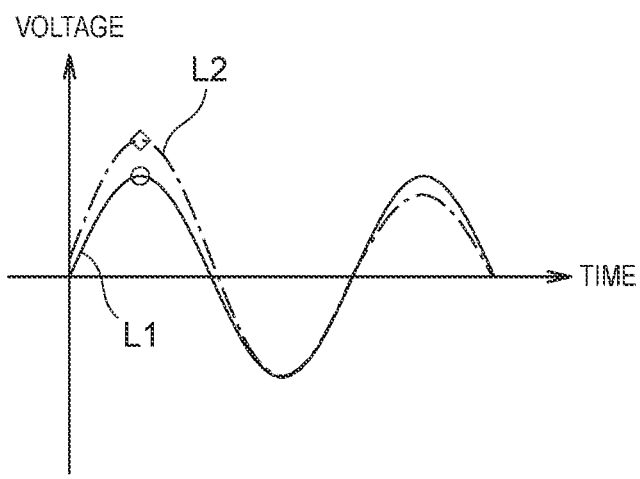
FIG. 12B is a waveform diagram depicting one example of the response current upon application of a harmonic voltage and upon application of a magnetic saturation voltage.

Specifically, the relative offset amount estimation unit 62 first causes the harmonic command output unit 110 to output the first voltage output command Voi1 to the control computation device 31, which then applies a harmonic voltage at such a level that the rotor 22R does not rotate and no magnetic saturation occurs in the stator 22S to the three-phase electric motor 22. For example, assume that a harmonic voltage having a waveform as depicted in FIG. 12A is applied. Next, the electric angle initial value estimation unit 111 detects the first current peak value Imp1 from the current detection value Im of a current that flows to the three-phase electric motor 22 in response to the application of the harmonic voltage. For example, when assuming that a response current as indicated by a solid line L1 in FIG. 12B flows, a peak value indicated by "o" in the same drawing is detected as the first current peak value Imp1. The electric angle initial value estimation unit 111 acquires the motor electric angle information θmi by referring to the electric angle information map stored in the ROM 51 from the detected first current peak value Imp1, and estimates the motor electric angle initial value θms on the basis of the acquired motor electric angle information θmi.

Subsequently, the relative offset amount estimation unit 62 causes the first magnetic saturation command output unit 113 to output the first saturation voltage output command Vsi1 to the control computation device 31, which then applies a harmonic voltage at such a level that the rotor 22R does not rotate and magnetic saturation occurs in the stator S22 (the first magnetic saturation voltage) to the three-phase electric motor 22. Then, the electric angle initial value correction unit 112 detects the second current peak value Imp2 from the current detection value Im of a current that flows to the three-phase electric motor 22 in response to the application of the first magnetic saturation voltage. For example, when assuming that a response current as indicated by a dot-and-dash line L2 in FIG. 12B flows, a peak value indicated by "0" in the same drawing is detected as the second current peak value Imp2. The electric angle initial value correction unit 112 acquires the motor electric angle correction information Cm by referring to the correction information map stored in the ROM 51 from the detected second current peak value Imp2, and corrects the motor electric angle initial value θms on the basis of the acquired motor electric angle correction information Cm.

Subsequently, the relative offset amount estimation unit 62 causes the offset amount estimation processing unit 114 to estimate the motor electric angle origin θmd on the basis of the corrected motor electric angle initial value θmsc, and to estimate the second relative offset amount θoff2 on the basis of the motor electric angle origin θmd and the reference value θosr of the output shaft rotation angle acquired at the time of the system restart. Then, the estimated second relative offset amount θoff2 is stored in the RAM 50.

Furthermore, the relative offset amount estimation unit 62 causes the relative offset amount selection unit 72 to read the second relative offset amount θoff2 from the RAM 50 since the abnormality detection signal SAr has the value representing the presence of abnormality due to the initial diagnosis after the system restart. Further, the relative offset amount estimation unit 62 causes the relative offset amount selection unit 72 to output the read second relative offset amount θoff2, as the relative offset amount θoff, to the motor electric angle estimation unit 63.

Accordingly, the motor electric angle estimation unit 63 calculates the motor electric angle estimation value θme from the output shaft rotation angle detection value θos detected by the output-side rotation angle sensor 13c, the second relative offset amount θoff2, the deceleration ratio RGr (for example, 20.5), and magnetic pole pairs (for example, 4). Then, the calculated motor electric angle estimation value θme is output as the second motor electric angle θm2 to the electric angle selection unit 23d.

Since the abnormality detection signal SAr has the value representing the presence of abnormality, the electric angle selection unit 23d outputs, as the motor electric angle θm, the second motor electric angle θm2 input from the sub motor electric angle detection circuit 23c to the control computation device 31.

Accordingly, the control computation device 31 drive-controls (controls commutation of) the three-phase electric motor 22 on the basis of the second motor electric angle θm2 estimated by the sub motor electric angle detection circuit 23c.

Herein, the electric angle initial value estimation unit 111 corresponds to a motor electric angle initial value estimation unit, the motor electric angle estimation unit 63 corresponds to a motor electric angle estimation unit, and the control computation device 31 and the motor electric angle detection circuit 23 correspond to a motor drive control unit.

Additionally, the steering torque sensor 13 corresponds to a torque detection unit, the output-side rotation angle sensor 13c corresponds to a steering angle detection unit, the three-phase electric motor 22 corresponds to a multi-phase electric motor, and the resolver 23a and the angle computation unit 60 correspond to a motor electric angle detection unit.

Additionally, the first and second inverter circuits 42A and 42B correspond to a motor drive circuit, the control computation device 31 corresponds to a control computation device, and the resolver abnormality diagnosis unit 61 corresponds to an abnormality diagnosis unit.

Effects of First Embodiment (1) In the motor control device 25 according to the first embodiment, the electric angle initial value estimation unit 111 estimates the motor electric angle initial value θms on the basis of a response output (a response current) of the three-phase electric motor 22 in response to input of a motor drive signal (a harmonic voltage) to the three-phase electric motor 22 when at least one of the resolver 23a and the angle computation unit 60 that detect the motor electric angle θm of the three-phase electric motor 22 that generates a steering assist force is diagnosed as being abnormal in an initial diagnosis after a system restart. The motor electric angle estimation unit 63 estimates the motor electric angle θm on the basis of the output shaft rotation angle detection value θos and the motor electric angle initial value θms (the second relative offset amount θoff2 estimated on the basis thereof). When the resolver 23a and the angle computation unit 60 are normal, the control computation device 31 and the motor electric angle detection circuit 23 drive-control the three-phase electric motor 22 on the basis of the first motor electric angle θm1 detected by these components. On the other hand, when at least one of the resolver 23a and the angle computation unit 60 is abnormal in an initial diagnosis after a system restart, the control computation device 31 and the motor electric angle detection circuit 23 drive-control the three-phase electric motor 22 on the basis of the second motor electric angle θm2 estimated by the motor electric angle estimation unit 63.

With this structure, when at least one of the resolver 23a and the angle computation unit 60 is diagnosed as being abnormal in an initial diagnosis after a system restart, it is possible to estimate the motor electric angle initial value θms on the basis of a response output of the three-phase electric motor 22 in response to input of a motor drive signal to the three-phase electric motor 22 and estimate the motor electric angle θm on the basis of the estimated motor electric angle initial value θms and the output shaft rotation angle detection value θos.

Accordingly, the three-phase electric motor 22 can be driven equivalently to normal time after a system restart even in a case where the system has been restarted after having once been stopped from the time when at least one of the revolver 23a and the angle computation unit 60 was diagnosed as being abnormal or where abnormality has occurred during a system stop.

(2) In the motor control device 25 according to the first embodiment, the steering torque sensor 13 detects the steering torque T transmitted to the steering mechanism. The output-side rotation angle sensor 13c detects a steering angle (the output shaft rotation angle detection value θos) of the steering. The three-phase electric motor 22 generates a steering assist force. The resolver 23a and the angle computation unit 60 detect the motor electric angle θm of the three-phase electric motor 22. The first and second inverter circuits 42A and 42B supply a drive current to the three-phase electric motor 22. The control computation device 31 drive-controls the first and second inverter circuits 42A and 42B on the basis of the steering torque T detected by the steering torque sensor 13 and the motor electric angle θm detected by the resolver 23a and the angle computation unit 60.

In addition, the resolver abnormality diagnosis unit 61 diagnoses abnormality in the resolver 23a and the angle computation unit 60. When at least one of the resolver 23a and the angle computation unit 60 that detect the motor electric angle θm of the three-phase electric motor 22 that generates a steering assist force is diagnosed as being abnormal in the initial diagnosis after the system restart, the electric angle initial value estimation unit 111 estimates the motor electric angle initial value θms on the basis of a response output (a response current) of the three-phase electric motor 22 in response to the input of a motor drive signal (a harmonic voltage) to the three-phase electric motor 22.

Furthermore, the motor electric angle estimation unit 63 estimates the motor electric angle θm on the basis of the output shaft rotation angle detection value θos detected by the output-side rotation angle sensor 13c and the motor electric angle initial value θms estimated by the electric angle initial value estimation unit 111 (the second relative offset amount θoff2 estimated on the basis thereof). When at least one of the resolver 23a and the angle computation unit 60 is diagnosed as being abnormal in an initial diagnosis by the resolver abnormality diagnosis unit 61 after a system restart, the control computation device 31 drive-controls the first and second inverter circuits 42A and 42B on the basis of the steering torque T detected by the steering torque sensor 13 and the motor electric angle estimation value θme estimated by the motor electric angle estimation unit 63 (the second motor electric angle θm2).

With this structure, when at least one of the resolver 23a and the angle computation unit 60 is diagnosed as being abnormal in an initial diagnosis after a system restart, it is possible to estimate the motor electric angle initial value θms on the basis of a response output of the three-phase electric motor 22 in response to input of a motor drive signal to the three-phase electric motor 22 and estimate the motor electric angle θm on the basis of the estimated motor electric angle initial value θms and the output shaft rotation angle detection value θos.

Accordingly, the three-phase electric motor 22 can be driven equivalently to normal time after a system restart even in a case where the system has been restarted after having once been stopped from the time when at least one of the revolver 23a and the angle computation unit 60 was diagnosed as being abnormal or where abnormality has occurred during a system stop.

(3) In the motor control device 25 according to the first embodiment, the electric angle initial value estimation unit 111 estimates the motor electric angle initial value θms on the basis of the current response at the time when the harmonic energization has been made to the three-phase electric motor 22.

With this structure, it is possible to estimate the motor electric angle initial value θms on the basis of the current response which is dependent on the motor electric angle of the three-phase electric motor 22 in response to the harmonic energization to the three-phase electric motor 22. For example, it is possible to estimate the motor electric angle initial value θms on the basis of motor electric angle information obtained from a peak value or the like of the response current.

Accordingly, even when at least one of the resolver 23a and the angle computation unit 60 is diagnosed as being abnormal in an initial diagnosis after a system restart, it is possible to estimate a motor electric angle that can accurately control commutation of the three-phase electric motor 22.

(4) In the motor control device 25 according to the first embodiment, the electric angle initial value correction unit 112 corrects the motor electric angle initial value θms on the basis of the current response at the time when the harmonic energization at such a level that magnetic saturation occurs has been applied to the three-phase electric motor 22.

With this structure, it is possible to correct the motor electric angle initial value θms on the basis of a current response which is dependent on the motor electric angle of the three-phase electric motor 22 in response to the harmonic energization at such a level that magnetic saturation occurs applied to the three-phase electric motor 22. For example, the motor electric angle initial value θms can be corrected on the basis of information obtained from a peak value or the like of the response current.

Accordingly, a more accurate motor electric angle initial value θms can be obtained.

(5) The electric power steering device 3 according to the first embodiment includes the motor control device 25.

With this structure, functions and effects equivalent to those of the motor control device 25 described in the (1) to (4) above can be obtained, and also the steering assist control can be continued even upon failure of the resolver 23a and the angle computation unit 60, so that reliability of the electric power steering device 3 can be improved.

(6) The vehicle 1 according to the first embodiment includes the electric power steering device 3 including the motor control device 25.

With this structure, functions and effects equivalent to those of the motor control device 25 described in the (1) to (4) above can be obtained, and also steering assist control can be continued even upon failure of the resolver 23a, so that reliability of the vehicle 1 can be improved.

Second Embodiment

Next, a second embodiment of the present invention will be described.
(Structure)

The second embodiment is different from the first embodiment in that the former includes a third relative offset amount estimation unit 73 instead of the second relative offset amount estimation unit 71 in the relative offset amount estimation unit 62 of the above first embodiment, and is the same as the first embodiment except for the difference.

Hereinafter, the same structural parts as those of the first embodiment are denoted by the same reference signs, and descriptions thereof will be omitted as appropriate, whereas different parts will be described in detail.
(Third Relative Offset Amount Estimation Unit 73)

Figure 13:
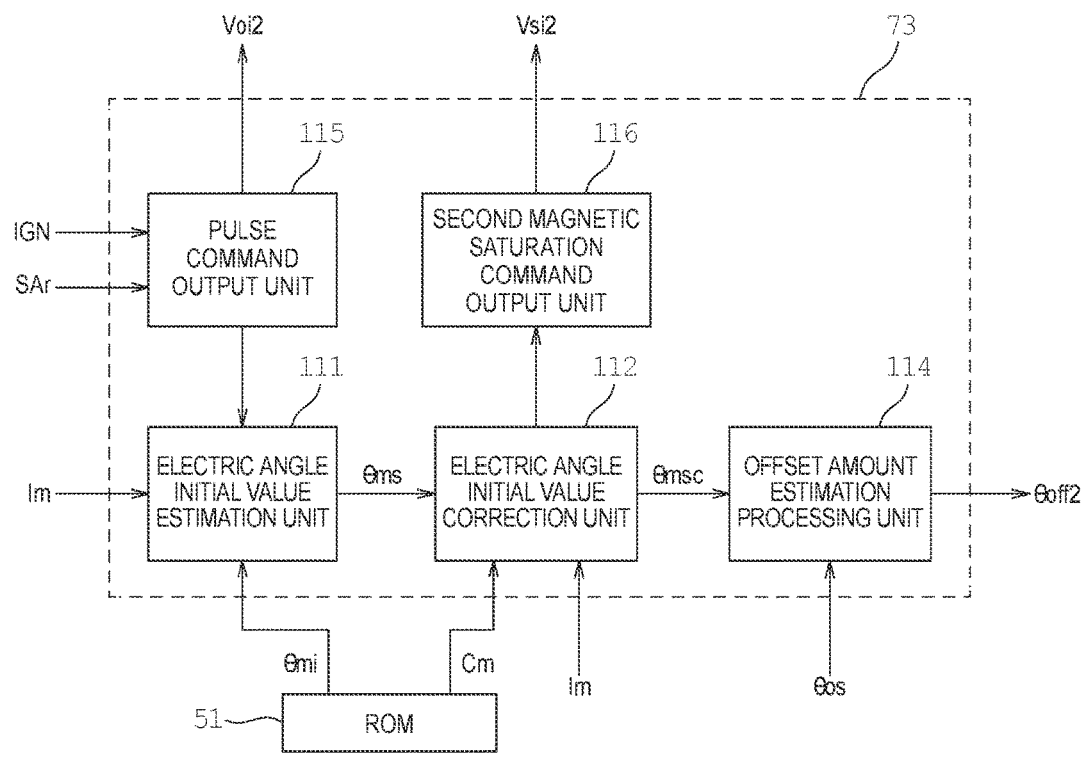
FIG. 13 is a block diagram depicting the specific structure of a third relative offset amount estimation unit according to a second embodiment of the present invention.

The third relative offset amount estimation unit 73 of the second embodiment includes a pulse command output unit 115, the electric angle initial value estimation unit 111, the electric angle initial value correction unit 112, a second magnetic saturation command output unit 116, and the offset amount estimation processing unit 114, as depicted in FIG. 13.

The pulse command output unit 115 outputs a second voltage output command Voi2 to the control computation device 31 when the abnormality detection signal SAr has the value representing the presence of abnormality in an initial diagnosis after a system restart. Herein, the second voltage output command Voi2 is an output command for a pulse wave voltage command at such a level that the rotor 22R of the three-phase electric motor 22 does not rotate and no magnetic saturation occurs in the stator 22S.

Figure 14:
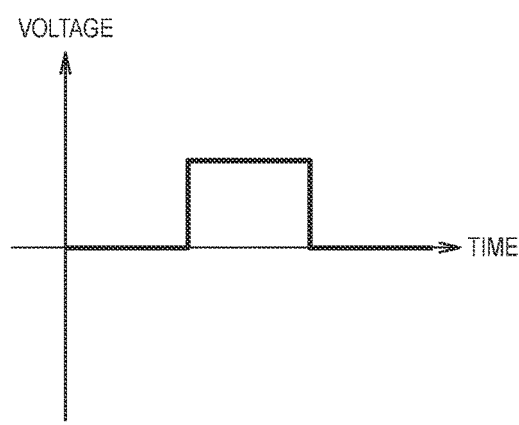
FIG. 14 is a waveform diagram depicting one example of a pulse wave voltage that is applied to the three-phase electric motor.

The control computation device 31 of the second embodiment generates a voltage command for performing energization with a pulse wave voltage in response to input of the second voltage output command Voi2, and outputs the generated voltage command to the gate drive circuits 41A and 41B. Accordingly, the energization to the three-phase electric motor 22, for example, with a pulse wave voltage depicted in FIG. 14 is performed via the first and second inverter circuits 42A and 42B.

The electric angle initial value estimation unit 111 of the second embodiment acquires, via the current detection circuits 34A and 34B, the current detection value Im of a current that flows to the three-phase electric motor 22 in response to the application of the pulse wave voltage, and detects a third current peak value Imp3 that is a peak value of the acquired current detection value Im.

Herein, a current which is dependent on the motor electric angle θm flows to the three-phase electric motor 22 in response to the application of the pulse wave voltage, similarly to the harmonic voltage of the first embodiment. Specifically, the third current peak value Imp3 that is a peak value of the current has motor electric angle information.

Then, in the second embodiment, as in the above first embodiment, a relationship between the third current peak value Imp3 and the motor electric angle information θmi is prepared as an electric angle information map in advance, and the electric angle information map is stored in the ROM 51.

The electric angle initial value estimation unit 111 reads the motor electric angle information θmi by referring to the electric angle information map stored in the ROM 51 from the detected third current peak value Imp3, and estimates the motor electric angle initial value θms on the basis of the read motor electric angle information θmi. The estimated motor electric angle initial value θms is output to the electric angle initial value correction unit 112.

The electric angle initial value correction unit 112 of the second embodiment outputs, in response to the input of the motor electric angle initial value θms, an output command for a voltage command with a pulse wave which is large to the extent (hereinafter may be described as "second magnetic saturation voltage command") that the rotor 22R of the three-phase electric motor 22 does not rotate and magnetic saturation occurs in the stator 22S to the second magnetic saturation command output unit 116.

The second magnetic saturation command output unit 116 outputs a second saturation voltage output command Vsi2 that is an output command for the second magnetic saturation voltage command to the control computation device 31 in response to the output command from the electric angle initial value correction unit 112.

The control computation device 31 of the second embodiment generates the second magnetic saturation voltage command in response to input of the second saturation voltage output command Vsi2, and outputs the generated second magnetic saturation voltage command to the gate drive circuits 41A and 41B. Accordingly, the energization with a pulse wave voltage (hereinafter may be described as "second magnetic saturation voltage") which is large to the extent that the magnetic saturation occurs to the three-phase electric motor 22 is performed via the first and second inverter circuits 42A and 42B.

The electric angle initial value correction unit 112 acquires, via the current detection circuits 34A and 34B, the current detection value Im of a current that flows to the three-phase electric motor 22 in response to application of the second magnetic saturation voltage, and detects a fourth current peak value Imp4 that is a peak value of the acquired current detection value Im.

Herein, even in the case of application of the second magnetic saturation voltage, a current which is dependent on the motor electric angle θm flows to the three-phase electric motor 22. In other words, a current flows that has the same characteristics as those in the case of application of the first magnetic saturation voltage in the above first embodiment.

Thus, in the second embodiment, a relationship between the fourth current peak value Imp4 and the motor electric angle correction information Cm is prepared as a correction information map in advance, and the correction information map is stored in the ROM 51.

The electric angle initial value correction unit 112 reads the motor electric angle correction information Cm by referring to the correction information map stored in the ROM 51 from the detected fourth current peak value Imp4, and corrects the motor electric angle initial value θms on the basis of the read motor electric angle correction information Cm. Then, the corrected motor electric angle initial value θmsc is output to the offset amount estimation processing unit 114.

The offset amount estimation processing unit 114 estimates the motor electric angle origin θmd on the basis of the corrected motor electric angle initial value θmsc from the electric angle initial value correction unit 112, and estimates the second relative offset amount θoff2 on the basis of the motor electric angle origin θmd and the reference value θosr of the output shaft rotation angle at the time of a system restart. Then, the estimated second relative offset amount θoff2 is stored in the RAM 50.

Herein, the electric angle initial value estimation unit 111 corresponds to a motor electric angle initial value estimation unit, the motor electric angle estimation unit 63 corresponds to a motor electric angle estimation unit, and the control computation device 31 and the motor electric angle detection circuit 23 correspond to a motor drive control unit.

Additionally, the steering torque sensor 13 corresponds to a torque detection unit, the output-side rotation angle sensor 13c corresponds to a steering angle detection unit, the three-phase electric motor 22 corresponds to a multi-phase electric motor, and the resolver 23a and the angle computation unit 60 correspond to a motor electric angle detection unit.

Additionally, the first and second inverter circuits 42A and 42B correspond to a motor drive circuit, the control computation device 31 corresponds to a control computation device, and the resolver abnormality diagnosis unit 61 corresponds to an abnormality diagnosis unit.

Effects of Second Embodiment

The second embodiment exhibits the following effects in addition to the effects of the first embodiment.

(1) In the motor control device 25 according to the second embodiment, the electric angle initial value estimation unit 111 estimates the motor electric angle initial value θms on the basis of the current response at the time when the pulse wave energization has been applied to the three-phase electric motor 22.

With this structure, it is possible to estimate the motor electric angle initial value θms on the basis of the current response which is dependent on the motor electric angle of the three-phase electric motor 22 in response to the pulse wave energization applied to the three-phase electric motor 22. For example, the motor electric angle initial value θms can be estimated on the basis of motor electric angle information obtained from a response current peak value or the like.

Accordingly, even when at least one of the resolver 23a and the angle computation unit 60 is diagnosed as being abnormal in the initial diagnosis after the system restart, it is possible to estimate a motor electric angle that can control commutation of the three-phase electric motor 22 equivalently to normal time.

(2) In the motor control device 25 according to the second embodiment, the electric angle initial value correction unit 112 corrects the motor electric angle initial value θms on the basis of the current response at the time when the pulse wave energization at such a level that magnetic saturation occurs has been applied to the three-phase electric motor 22.

With this structure, it is possible to correct the motor electric angle initial value θms on the basis of the current response which is dependent on the motor electric angle of the three-phase electric motor 22 in response to the pulse wave energization at such a level that magnetic saturation occurs applied to the three-phase electric motor 22. For example, the motor electric angle initial value θms can be corrected on the basis of information obtained from a response current peak value or the like.

Accordingly, a more accurate motor electric angle initial value θms can be obtained.

Third Embodiment

Next, a third embodiment of the present invention will be described.

(Structure)

The third embodiment is different from the above first embodiment in that the former includes a fourth relative offset amount estimation unit 74 instead of the second relative offset amount estimation unit 71 in the relative offset amount estimation unit 62 of the first embodiment, and is the same as the first embodiment except for the difference.

Hereinafter, the same structural parts as those in the first embodiment are denoted by the same reference signs, and descriptions thereof will be omitted as appropriate, whereas different parts will be described in detail.

(Fourth Relative Offset Amount Estimation Unit 74)

Figure 15:
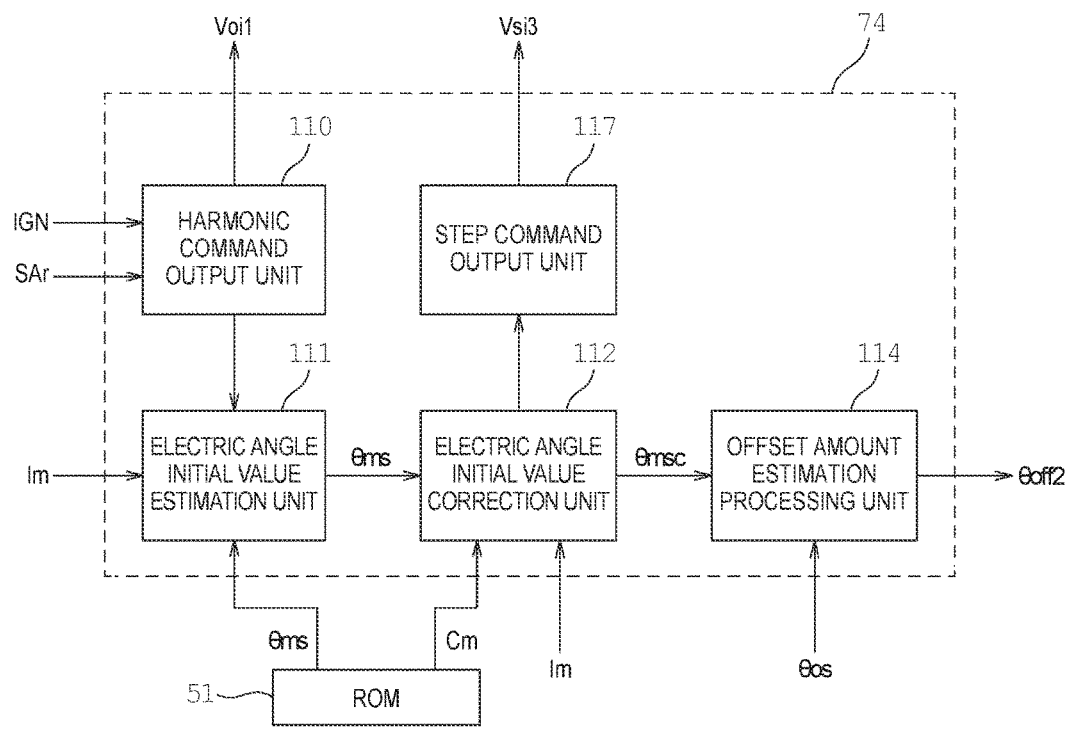
FIG. 15 is a block diagram depicting the specific structure of a fourth relative offset amount estimation unit according to a third embodiment of the present invention.

The fourth relative offset amount estimation unit 74 of the third embodiment includes the harmonic command output unit 110, the electric angle initial value estimation unit 111, the electric angle initial value correction unit 112, a step command output unit 117, and the offset amount estimation processing unit 114, as depicted in FIG. 15.

The electric angle initial value correction unit 112 of the third embodiment outputs an output command for a step wave voltage command (hereinafter may be described as "step voltage command") at such a level that the rotor 22R of the three-phase electric motor 22 does not rotate to the step command output unit 117 in response to the input of the motor electric angle initial value θms.

The step command output unit 117 outputs a step voltage output command Vsi3 that is an output command for the step voltage command to the control computation device 31 in response to the output command from the electric angle initial value correction unit 112.

The control computation device 31 of the third embodiment generates the step voltage command in response to the input of the step voltage output command Vsi3, and outputs the generated step voltage command to the gate drive circuits 41A and 41B. Accordingly, the energization with a step wave voltage (hereinafter may be described as "step wave voltage") to the three-phase electric motor 22 is performed via the first and second inverter circuits 42A and 42B.

Figure 16:
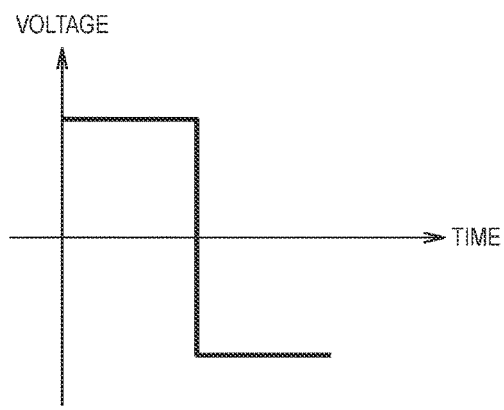
FIG. 16 is a waveform diagram depicting one example of a step wave voltage that is applied to the three-phase electric motor.

The electric angle initial value correction unit 112 acquires, via the current detection circuits 34A and 34B, the current detection value Im of a current that flows to the three-phase electric motor 22 in response to the application of, for example, a step wave voltage as indicated in FIG. 16, and detects a fifth current peak value Imp5 that is a peak value of the acquired current detection value Im.

Herein, even in the case of application of the step wave voltage, a current which is dependent on the motor electric angle θm flows to the three-phase electric motor 22. Thus, in the third embodiment, a relationship between the fifth current peak value Imp5 and the motor electric angle correction information Cm is prepared as a correction information map in advance, and the correction information map is stored in the ROM 51.

The electric angle initial value correction unit 112 reads the motor electric angle correction information Cm by referring to the correction information map stored in the ROM 51 from the detected fifth current peak value Imp5, and corrects the motor electric angle initial value θms on the basis of the read motor electric angle correction information Cm. Then, the corrected motor electric angle initial value θmsc is output to the offset amount estimation processing unit 114.

The offset amount estimation processing unit 114 estimates the motor electric angle origin θmd on the basis of the corrected motor electric angle initial value θmsc from the electric angle initial value correction unit 112. Furthermore, the offset amount estimation processing unit 114 estimates the second relative offset amount θoff2 on the basis of the motor electric angle origin θmd and the reference value θosr of the output shaft rotation angle at the time of a system restart. Then, the estimated second relative offset amount θoff2 is stored in the RAM 50.

Herein, the electric angle initial value estimation unit 111 corresponds to a motor electric angle initial value estimation unit, the motor electric angle estimation unit 63 corresponds to a motor electric angle estimation unit, and the control computation device 31 and the motor electric angle detection circuit 23 correspond to a motor drive control unit.

Additionally, the steering torque sensor 13 corresponds to a torque detection unit, the output-side rotation angle sensor 13c corresponds to a steering angle detection unit, the three-phase electric motor 22 corresponds to a multi-phase electric motor, and the resolver 23a and the angle computation unit 60 correspond to a motor electric angle detection unit.

Additionally, the first and second inverter circuits 42A and 42B correspond to a motor drive circuit, the control computation device 31 corresponds to a control computation device, and the resolver abnormality diagnosis unit 61 corresponds to an abnormality diagnosis unit.

Effects of Third Embodiment

The third embodiment exhibits the following effects in addition to the effects of the first and second embodiments.

(1) In the motor control device 25 according to the third embodiment, the motor electric angle initial value θms is corrected on the basis of the current response at the time when the step-shaped wave energization has been applied to the three-phase electric motor 22.

With this structure, it is possible to correct the motor electric angle initial value θms on the basis of the current response which is dependent on the motor electric angle of the three-phase electric motor 22 in response to the step-shaped wave energization applied to the three-phase electric motor 22. For example, the motor electric angle initial value θms can be corrected on the basis of information obtained from a response current peak value or the like.

Accordingly, a more accurate motor electric angle initial value θms can be obtained.

(Modifications)

(1) The above embodiments have been configured to estimate the motor electric angle on the basis of the output shaft rotation angle detection value θos detected by the output-side rotation angle sensor 13c forming the steering torque sensor 13. However, the invention is not limited to the configuration. For example, the motor electric angle may be estimated on the basis of a rotation angle detected by another sensor as long as it is a sensor that detects the rotation angle of a shaft that rotates by operation of the steering wheel 11, such as that the motor electric angle is estimated on the basis of an input shaft rotation angle θ is detected by the input-side rotation angle sensor 13b.

(2) The above embodiments have described the case where the d-axis current command value Id* and the q-axis current command value Iq* are calculated on the basis of the steering assist current command value by the steering assist control processing of the control computation device 31, the dq-phase to three-phase conversion of these values is performed to calculate the U-phase current command value Iu*, the V-phase current command value Iv*, and the W-phase current command value Iw*, and the current deviations ΔIu, ΔIv, and ΔIw between the values Iu*, Iv*, and Iw* and added values of the current detection values of the respective phases are calculated. However, the present invention is not limited to the above configuration. The added values of the current detection values of the respective phases may be dq-axis converted, deviations ΔId and ΔIq between the dq-axis converted values and the d-axis current command value Id* and the q-axis current command value Iq* may be calculated, and the deviations ΔId and ΔIq may be dq-phase to three-phase converted.

(3) The above embodiments have described the example in which the present invention is applied to the column assist electric power steering device. However, the present invention is not limited to this configuration, and, for example, the present invention may be applied to a rack assist or pinion assist electric power steering device.

While the present invention has been described with reference to the limited number of embodiments, the scope of the invention is not limited thereto, and modifications of the respective embodiments based on the above disclosure are obvious to those skilled in the art.

REFERENCE SIGNS LIST

1 Vehicle
3 Electric power steering device
11 Steering wheel
12 Steering shaft
12b Output shaft
13 Steering torque sensor
13c Output-side rotation angle sensor
18 Steering gear
20 Steering assist mechanism
22 Three-phase electric motor
23 Motor electric angle detection circuit
23a Resolver
23b Main motor electric angle detection circuit
23c Sub motor electric angle detection circuit
23d Electric angle selection unit
25 Motor control device
26 Vehicle speed sensor
27 Battery
28 IGN switch
31 Control computation device
32A First motor drive circuit
32B Second motor drive circuit
33A First motor current block circuit
33B Second motor current block circuit
34A, 34B Current detection circuit
35A First abnormality detection circuit 35B Second abnormality detection circuit
41A, 41B Gate drive circuit
42A First inverter circuit
42B Second inverter circuit
43 Noise filter
44A First power supply block circuit
44B Second power supply block circuit
60 Angle computation unit
61 Resolver abnormality diagnosis unit
62 Relative offset amount estimation unit
63 Motor electric angle estimation unit
70 First relative offset amount estimation unit
71, 73, 74 Second, third, fourth relative offset amount estimation unit
72 Relative offset amount selection unit
110 Harmonic command output unit
111 Electric angle initial value estimation unit
112 Electric angle initial value correction unit
113, 116 First, second magnetic saturation command output unit
114 Offset amount estimation processing unit
115 Pulse command output unit
117 Step command output unit

The invention claimed is:

1. A motor control device, comprising:
a motor electric angle initial value estimation unit that, when a motor electric angle detection unit, that detects a motor electric angle of a multi-phase electric motor that generates a steering assist force, is diagnosed as being abnormal in an initial diagnosis after a system restart, estimates an initial value of the motor electric angle on a basis of a response output of the multi-phase electric motor in response to input of a motor drive signal to the multi-phase electric motor;
a motor electric angle estimation unit that calculates a motor electric angle estimation value $\theta me$ according to a formula (1): $\theta me = \theta os \times RGr \times P + \theta off$, wherein $\theta os$ is an output shaft rotational angle detection value which is a steering angle detected by a steering angle detection unit, RGr is a deceleration ratio, P is a number of pole pairs, and $\theta off$ is an offset amount between an origin of the motor electric angle and a reference value of an output shaft rotation angle;
a motor drive control unit that, when the motor electric angle detection unit is normal, drive-controls the multi-phase electric motor on a basis of the motor electric angle detected by the motor electric angle detection unit, and when the motor electric angle detection unit is diagnosed as being abnormal in the initial diagnosis after the system restart, drive-controls the multi-phase electric motor on a basis of the motor electric angle estimation value estimated by the motor electric angle estimation unit;
wherein the motor electric angle initial value estimation unit estimates the initial value of the motor electric angle on a basis of a current; response at a time when a harmonic or pulse wave energization has been applied to the multi-phase electric motor; and
a motor electric angle initial value correction unit that corrects the initial value of the motor electric angle on a basis of a current response at a time when a harmonic or pulse wave energization at such a level that magnetic saturation occurs has been applied to the multi-phase electric motor.

2. The motor control device according to claim 1, wherein the multi-phase electric motor includes motor windings of two systems.

3. A motor control device, comprising:
a motor electric angle initial value estimation unit that, when a motor electric angle detection unit, that detects a motor electric angle of a multi-phase electric motor that generates a steering assist force, is diagnosed as being abnormal in an initial diagnosis after a system restart, estimates an initial value of the motor electric angle on a basis of a response output of the multi phase electric motor in response to input of a motor drive signal to the multi-phase electric motor;
a motor electric angle estimation unit that calculates a motor electric angle estimation value $\theta me$ according to a formula (1): $\theta me = \theta os \times RGr \times P + \theta off$, wherein $\theta os$ is an output shaft rotational angle detection value which is a steering angle detected by a steering angle detection unit, RGr is a deceleration ratio, P is a number of pole pairs, and $\theta off$ is an offset amount between an origin of the motor electric angle and a reference value of an output shaft rotation angle;
a motor drive control unit that, when the motor electric angle detection unit is normal, drive-controls the multi-phase electric motor on a basis of the motor electric angle detected by the motor electric angle detection unit, and when the motor electric angle detection unit is diagnosed as being abnormal in the initial diagnosis after the system restart, drive-controls the multi-phase electric motor on a basis of the motor electric angle estimation value estimated by the motor electric angle estimation unit;
wherein the motor electric angle initial value estimation unit estimates the initial value of the motor electric angle on a basis of a current response at a time when a harmonic or pulse wave energization has been applied to the multi-phase electric motor; and
a motor electric angle initial value correction unit that corrects the initial value of the motor electric angle on a basis of a current response at a time when a step-shaped wave energization has been applied to the multi-phase electric motor.

* * * * *